US006982848B2

(12) United States Patent
Inaji et al.

(10) Patent No.: US 6,982,848 B2
(45) Date of Patent: Jan. 3, 2006

(54) DISK APPARATUS AND HEAD POSITIONING METHOD

(75) Inventors: Toshio Inaji, Osaka (JP); Keizo Miyata, Kyoto (JP); Hiroshi Kohso, Osaka (JP); Makoto Umeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 37 days.

(21) Appl. No.: 10/852,135

(22) Filed: May 25, 2004

(65) Prior Publication Data

US 2004/0240101 A1 Dec. 2, 2004

(30) Foreign Application Priority Data

May 30, 2003 (JP) ............................. 2003-154380
Jun. 17, 2003 (JP) ............................. 2003-171524

(51) Int. Cl.
*G11B 5/596* (2006.01)
*G11B 21/02* (2006.01)

(52) U.S. Cl. ................... 360/77.02; 360/75; 360/78.04
(58) Field of Classification Search ................. 360/75, 360/77.02, 77.07, 77.08, 78.04, 78.11
See application file for complete search history.

(56) References Cited

U.S. PATENT DOCUMENTS

| 5,844,743 A | 12/1998 | Funches |
| 6,690,536 B1 * | 2/2004 | Ryan ........................ 360/78.04 |

FOREIGN PATENT DOCUMENTS

| JP | 3-30156 | 2/1991 |
| JP | 5-62385 | 3/1993 |
| JP | 9-231701 | 9/1997 |

* cited by examiner

*Primary Examiner*—Andrew L. Sniezek
(74) *Attorney, Agent, or Firm*—McDermott Will & Emery LLP

(57) ABSTRACT

A disk apparatus includes: an actuator 7; a driver 10; a voltage detector 11 for outputting first voltage signal Ed which is produced in a driving coil 5 of the actuator 7; a voltage signal adjuster 16 for outputting pseudo disturbance signal ur and generating second voltage signal $Ed^+$ from pseudo disturbance signal ur, driving signal u, first voltage signal Ed, and disturbance estimation signal $\tau d_{est}$; a disturbance estimator 12 for estimating the magnitude of disturbance load $\tau d$ applied to a magnetic head 2 from driving signal u and second voltage signal $Ed^+$ to output disturbance estimation signal $\tau d_{est}$; a position detector 13 for generating position error signal e which corresponds to a current position of the magnetic head 2; a position controller 14 for generating control signal c from position error signal e; and a corrector 15 for generating driving signal u from disturbance estimation signal $\tau d_{est}$ and position control signal c.

26 Claims, 14 Drawing Sheets

Frequency f/fm

DISK APPARATUS AND HEAD POSITIONING METHOD

BACKGROUND OF THE INVENTION

1. Field of the Invention

The present invention relates to a disk apparatus wherein positioning of a recording/reproduction head, such as a magnetic head, an optical pickup, or the like, is performed using an actuator, and to a control method of such a disk apparatus.

2. Description of the Prior Art

In recent years, disk apparatuses, such as magnetic disk apparatuses, and the like, have been decreasing in size and increasing in capacity. For example, the capacity of magnetic disk apparatuses has been increased by increasing the track density of magnetic disks, and the track pitch will be further reduced in the future. Therefore, in order to record/reproduce data on/from a magnetic disk, it is necessary to precisely position a magnetic head at a target track among the tracks formed at a small pitch.

In a commonly-employed magnetic disk apparatus, servo information used for positioning a magnetic head is stored in a magnetic disk in advance, and the magnetic head is positioned according to the servo information. Specifically, the position of the magnetic head is detected by reading the servo information with the magnetic head, and an error between the position of a target track and the current position of the magnetic head is determined. Then, a position error signal which indicates the position error of the magnetic head with respect to the target track is generated, and the magnetic head is positioned such that the position error signal becomes minimum.

Further, in order to increase the accuracy in positioning the magnetic head, the control frequency of a magnetic head positioning control system is set to be high, and the magnetic head is quickly positioned at a target track, such that a necessary positioning accuracy is ensured.

However, an actuator of the disk apparatus itself may have a natural vibration mode of higher-order. Thus, if the control frequency is increased for the purpose of increasing the positioning accuracy, the positioning system may become unstable due to the natural vibration. In an actual case, the band of the control frequency is limited due to a natural mechanical vibration of an actuator itself, and therefore, increasing the control frequency of the positioning system is limited.

In recent years, the effect of external force that acts against an actuator on the positioning system has been increasing along with the increase in the track density and the decrease in size and weight of the actuator. Further, demand for accurate positioning of a magnetic head has become more and more severe along with the reduction in size and the increase in recording density of the magnetic disk apparatus. In view of such, in the magnetic disk apparatus industry, a control method in which the effect of external force is considered has been receiving attention, and compensation of external force by feed-forward control has been practiced.

For example, a control method has been proposed wherein a head position signal is obtained from servo information recorded in a magnetic disk, and external force is compensated by disturbance estimation means to which the head position signal and a driving signal of an actuator are input (see, for example, Japanese Unexamined Patent Publication No. 9-231701).

Examples of external force that acts against the actuator include disturbance, such as inertial force that acts against the actuator due to the effect of external impact or vibration, bearing friction in the actuator, elastic force of a flexible print circuit (FPC) which connects the actuator and an electronic circuit board, etc. In the above conventional disk apparatus, disturbance estimation means for estimating such disturbance receives a head position signal and a driving signal of the actuator and operates based on these signals. However, servo information recorded in a magnetic disk discretely exists over the disk with a certain sampling frequency, and therefore, the head position signal is not a serial signal. Thus, the control band in which the disturbance estimation means can estimate disturbance is influenced by the sampling frequency of sector servo of a magnetic disk apparatus, and the upper limit is determined by the sampling frequency of the sector servo. This upper limit makes it difficult to precisely estimate external force that acts against the actuator. Further, the upper limit also makes it difficult to reduce the effect of the disturbance that externally acts against the actuator to a level such that the reduced effect causes no trouble in actual practice. As a result, it is difficult to control a head to always precisely follow a target track.

On the other hand, in some cases, the resistance value of a driving coil of the actuator is different among driving coils. In other cases, a driving coil emits heat when a driving current flows through the driving coil, and the resistance value thereof varies due to the increase in temperature of the coil. In such cases, the positioning system including the disturbance estimation means becomes unstable due to an error in the resistance value of the driving coil (deviation from the nominal value).

It should be noted that the above problems are not limited to magnetic disk apparatuses but are common among general disk apparatuses.

SUMMARY OF THE INVENTION

The present invention was conceived for solving the above problems. An objective of the present invention is to precisely estimate disturbance that acts against an actuator with disturbance estimation means and precisely and stably position a head at a target track even when the resistance value of a coil of the actuator deviates from the nominal value.

A disk apparatus of the present invention comprises: an actuator including a voice coil motor, an arm provided to the voice coil motor, and a head attached to the arm for recording and/or reproducing information; driving means for driving the actuator, the driving means receiving a driving signal used for driving the actuator and a pseudo disturbance signal that simulates disturbance applied to the actuator; a voltage detection means for detecting a voltage induced in the voice coil motor by the driving of the actuator to output a first voltage signal which corresponds to the detected voltage; voltage signal adjustment means for outputting the pseudo disturbance signal, receiving the driving signal, a disturbance estimation signal that estimates disturbance, and the first voltage signal, and adjusting the first voltage signal such that a deviation of a coil resistance of the voice coil motor from a nominal value is corrected except for the times of recording and reproduction of the information, thereby generating a second voltage signal; and disturbance estimation means for estimating the magnitude of the disturbance applied to the actuator from the driving signal and the second voltage signal to generate the disturbance estimation signal.

With the above structure, the disturbance estimation means correctly estimates the magnitude of disturbance that acts against the actuator (e.g., bearing friction of the actuator, elastic force of a FPC which connects the actuator and an electronic circuit board, inertial force that acts against the actuator due to impact or vibration externally applied to the disk apparatus, or the like) based on the driving signal used for driving the actuator and the second voltage signal generated by the voltage signal adjustment means.

In the above disk apparatus, the first voltage signal corresponding to the induction voltage of the voice coil motor is not directly input to the disturbance estimation means. The first voltage signal is adjusted such that a deviation of the coil resistance of the voice coil motor from a nominal value is corrected, whereby the second voltage signal is generated. The second voltage signal is input to the disturbance estimation means. Thus, even when there is a variation in the resistance value among the voice coil motors of the actuators or even when the resistance value changes due to electric conduction or an increase in temperature, the voltage signal produced in the voice coil motor by the driving of the actuator is correctly calculated.

Preferably, the voltage signal adjustment means further receives the pseudo disturbance signal, and the disk apparatus further includes correction means for receiving a position control signal used for positioning the head at a target position and the disturbance estimation signal and outputting the driving signal.

In the operation of controlling the head to follow a target track (hereinafter, referred to as "following operation"), it is important to correctly estimate the magnitude of disturbance applied to an actuator. In the above disk apparatus, disturbance estimated by the disturbance estimation means is output to the correction means as a disturbance estimation signal. The correction means corrects the position control signal based on the disturbance estimation signal such that the disturbance applied to the actuator is canceled. The corrected position control signal is output from the correction means as the driving signal.

In the above disk apparatus, the actuator is driven based on the driving signal, and therefore, the disturbance applied to the actuator is canceled in a desirable manner. That is, the disturbance applied to the actuator is compensated for, and therefore, positioning of the head at a target track is stably performed even when a variation of the disturbance is large in the following operation for the target track.

Furthermore, since the second voltage signal obtained by adjusting the first voltage signal such that a deviation of the coil resistance of the voice coil motor from a nominal value is corrected is input to the disturbance estimation means, positioning of the head at a target track is stably performed. That is, the positioning accuracy is improved even with various variations in the conditions.

The voltage signal adjustment means may generate the second voltage signal such that the phase of the disturbance estimation signal is generally the same as the phase of the pseudo disturbance signal.

With the above structure, the first voltage signal is adjusted such that the phase of the disturbance estimation signal is generally the same as the phase of the pseudo disturbance signal, and the adjusted signal is input to the disturbance estimation means as the second voltage signal. That is, the first voltage signal is supplied to the disturbance estimation means as a signal which has been adjusted such that a deviation of the coil resistance of the voice coil motor from a nominal value is corrected (=the second voltage signal). Therefore, a stable operation is achieved in the positioning system that includes the disturbance estimation means.

Preferably, the voltage signal adjustment means includes signal generation means for generating a first reference signal and a second reference signal, phase comparison means for receiving the disturbance estimation signal and the first reference signal and integrating a multiplication result obtained by multiplying the disturbance estimation signal and the first reference signal for a predetermined time period, thereby sequentially generating a phase signal, integration means for sequentially integrating the phase signal to generate a correction signal and holding the correction signal if the value of the phase signal is within a predetermined range, multiplication means for multiplying the correction signal and a signal obtained by synthesizing the driving signal and the pseudo disturbance signal, and adjustment means for generating the second voltage signal from a signal output from the multiplication means and the first voltage signal; the pseudo disturbance signal is formed by the second reference signal; and input of the pseudo disturbance signal to the driving means and the voltage signal adjustment means lasts till the value of the phase signal falls within a predetermined range.

With the above structure, completion of the resistance correction operation of the voice coil motor is determined when the phase signal falls within a predetermined range, and after the completion of the operation, positioning of the head is performed based on the corrected resistance value. With the above structure, even when there is a variation in the resistance value among the voice coil motors or even when the resistance value changes due to an increase in temperature, the induction voltage produced by the driving of the actuator is precisely detected within a short time period. Thus, a stable operation is achieved in the positioning system that includes the disturbance estimation means.

Preferably, the disk apparatus further comprises input prohibition means for prohibiting input of the disturbance estimation signal to the correction means till the value of the phase signal falls within a predetermined range.

With the above structure, the disturbance estimation means does not generate a correct disturbance estimation signal during the time when the second voltage signal is adjusted such that the phase of the disturbance estimation signal is the same as the phase of the pseudo disturbance signal. During this period, the feed-forward control is not performed in the positioning system, whereby a more stable operation is achieved in the positioning system.

Alternatively, it is possible that: the voltage signal adjustment means includes signal generation means for generating a first reference signal and a second reference signal, phase comparison means for receiving the disturbance estimation signal and the first reference signal and integrating a multiplication result obtained by multiplying the disturbance estimation signal and the first reference signal for a predetermined time period, thereby sequentially generating a phase signal, integration means for integrating the phase signal to generate a correction signal and holding the correction signal after the passage of a predetermined time period, multiplication means for multiplying the correction signal and a signal obtained by synthesizing the driving signal and the pseudo disturbance signal, and adjustment means for generating the second voltage signal from a signal output from the multiplication means and the first voltage signal; the pseudo disturbance signal is formed by the second reference signal; and input of the pseudo disturbance signal to the driving means and the voltage signal adjustment means lasts for a predetermined time period.

With the above structure, completion of the resistance correction operation of the voice coil motor is determined when a predetermined time period elapses after the start of input of the pseudo disturbance signal, and after the completion of the operation, positioning of the head is performed based on the corrected resistance value. With the above structure, even when there is a variation in the resistance value among the voice coil motors or even when the resistance value changes due to an increase in temperature, the induction voltage produced by the driving of the actuator is precisely detected within a short time period. Thus, a stable operation is achieved in the positioning system that includes the disturbance estimation means.

Preferably, the disk apparatus further comprises input prohibition means for prohibiting input of the disturbance estimation signal to the correction means till a predetermined time period elapses after the start of input of the pseudo disturbance signal.

With the above structure, the disturbance estimation means does not generate a correct disturbance estimation signal during the time when the second voltage signal is adjusted such that the phase of the disturbance estimation signal is the same as the phase of the pseudo disturbance signal. During this period, the feed-forward control is not performed in the positioning system, whereby a stable operation is achieved in the positioning system.

Preferably, each of the first and second reference signals is formed by a signal having a frequency which is an integral multiple of a rotation frequency of a disk.

When the disk apparatus is affected by many disturbances that are in synchronization with the rotation of the disk due to runouts of the disk, or the like, the disturbance estimation signal generated by the disturbance estimation means includes many components that are in synchronization with the rotation of the disk. With the above structure, the frequency of the second reference signal input to the phase comparison means is equal to an integral multiple of the rotation frequency of the disk. Thus, an error caused by disturbance which is in synchronization with the rotation of the disk is reduced. As a result, the induction voltage produced by the driving of the actuator is obtained more accurately, and a more stable operation is achieved in the positioning system.

Preferably, the first reference signal and the second reference signal have the same frequency but different phases; and the phase of the first reference signal is further delayed by a phase delay of the disturbance estimation signal with respect to the second reference signal.

With the above structure, the phase of the first reference signal is delayed by a phase delay of the disturbance estimation signal before the first reference signal is input to the phase comparison means. Thus, an error is unlikely to occur in the phase signal generated by the phase comparison means. The voltage signal adjustment means corrects a voltage decrement produced by the resistance error of the voice coil motor using the correction signal. Thus, the second voltage signal does not include the voltage decrement but only includes the induction voltage produced by the driving of the actuator. Therefore, a more stable operation is achieved in the positioning system that includes the disturbance estimation means.

Preferably, the phase signal is generated by time-integrating a multiplication result obtained by multiplying the disturbance estimation signal and the first reference signal for a time period which is an integral multiple of a rotation cycle of a disk.

With the above structure, even when the disk apparatus is affected by many disturbances that are in synchronization with the rotation of the disk due to runouts of the disk, or the like, and the disturbance estimation signal generated by the disturbance estimation means includes many components that are in synchronization with the rotation of the disk, an error caused by such disturbance that is in synchronization with the disk rotation is reduced. As a result, the induction voltage produced by the driving of the actuator is obtained more accurately, and a stable operation is achieved in the positioning system.

The voltage signal adjustment means may generate the second voltage signal such that the largeness of the disturbance estimation signal becomes minimum.

In this specification, the word "minimum" used for defining the magnitude of the disturbance estimation signal is not necessarily limited to a minimum value in a strict sense but may mean a value which can be substantially regarded as a minimum. When detecting the largeness of the disturbance estimation signal, detection is performed with a predetermined sampling frequency in many cases. In such cases, the disturbance estimation signal is detected in a discrete fashion. The smallest one of the plurality of detected values can be regarded as a minimum. As a matter of course, it is possible that the disturbance estimation signal is continually (analogly) detected, and the first voltage signal is adjusted such that the disturbance estimation signal becomes minimum in a strict sense.

With the above structure, the first voltage signal is adjusted such that the largeness of the disturbance estimation signal with respect to the pseudo disturbance signal becomes minimum, and the adjusted signal is input to the disturbance estimation means as the second voltage signal. That is, the first voltage signal is supplied to the disturbance estimation means as a signal which has been adjusted such that a deviation of the coil resistance of the voice coil motor from a nominal value is corrected (=the second voltage signal). Therefore, a stable operation is achieved in the positioning system that includes the disturbance estimation means.

Preferably, the voltage signal adjustment means includes signal generation means for generating a reference signal, amplitude retaining means for receiving the disturbance estimation signal, detecting a maximum value of the amplitude of the disturbance estimation signal every predetermined cycle while retaining the maximum value, and generating an amplitude signal which represents the maximum value at the end of each cycle, difference integration means for outputting a correction signal used for generating the second voltage signal and generating a difference signal that represents a difference between an amplitude signal of a current cycle and an amplitude signal of an immediately previous cycle every cycle, wherein if the difference signal is not within a predetermined range, the difference integration means adjusts the correction signal such that the difference signal falls within the predetermined range, and if the difference signal is within the predetermined range, the difference integration means holds the correction signal, multiplication means for multiplying the correction signal and a signal obtained by synthesizing the driving signal and the pseudo disturbance signal, and adjustment means for generating the second voltage signal from a signal output from the multiplication means and the first voltage signal; the pseudo disturbance signal is formed by the reference signal; and input of the pseudo disturbance signal to the driving means and the voltage signal adjustment means lasts till the difference signal falls within the predetermined range.

In this specification, the word "maximum" used for defining the amplitude of the disturbance estimation signal is not necessarily limited to a maximum value in a strict sense but may mean a value which can be substantially regarded as a maximum. When the amplitude is detected in a discrete manner, the largest one of the plurality of detected values may be regarded as a maximum value. The predetermined cycle may be a cycle of a constant time interval or may be an inconstant cycle.

With the above structure, completion of the resistance correction operation of the voice coil motor is determined when the difference signal falls within a predetermined range, and after the completion of the operation, positioning of the head is performed based on the corrected resistance value. With the above structure, even when there is a variation in the resistance value among the voice coil motors or even when the resistance value changes due to an increase in temperature, the induction voltage produced by the driving of the actuator is precisely detected within a short time period. Thus, a stable operation is achieved in the positioning system that includes the disturbance estimation means.

Preferably, the disk apparatus further comprises input prohibition means for prohibiting input of the disturbance estimation signal to the correction means till the difference signal falls within the predetermined range.

With the above structure, the disturbance estimation means does not generate a correct disturbance estimation signal during the time when the correction signal is adjusted such that the difference signal falls within a predetermined range. During this period, the feed-forward control is not performed in the positioning system, whereby a more stable operation is achieved in the positioning system.

Alternatively, it is possible that: the voltage signal adjustment means includes signal generation means for generating a reference signal, amplitude retaining means for receiving the disturbance estimation signal, detecting a maximum value of the amplitude of the disturbance estimation signal every predetermined cycle while retaining the maximum value, and generating an amplitude signal which represents the maximum value at the end of each cycle, difference integration means for outputting a correction signal used for generating the second voltage signal and generating a difference signal that represents a difference between an amplitude signal of a current cycle and an amplitude signal of an immediately previous cycle every cycle, wherein if the difference signal is not within a predetermined range, the difference integration means adjusts the correction signal such that the difference signal falls within the predetermined range, and after the passage of a predetermined time period, the difference integration means holds the correction signal, multiplication means for multiplying the correction signal and a signal obtained by synthesizing the driving signal and the pseudo disturbance signal, and adjustment means for generating the second voltage signal from a signal output from the multiplication means and the first voltage signal; the pseudo disturbance signal is formed by the reference signal; and input of the pseudo disturbance signal to the driving means and the voltage signal adjustment means lasts till the predetermined time period elapses.

With the above structure, completion of the resistance correction operation of the voice coil motor is determined when a predetermined time period elapses after the start of input of the pseudo disturbance signal, and after the completion of the operation, positioning of the head is performed based on the corrected resistance value. With the above structure, even when there is a variation in the resistance value among the voice coil motors or even when the resistance value changes due to an increase in temperature, the induction voltage produced by the driving of the actuator is precisely detected within a short time period. Thus, a stable operation is achieved in the positioning system that includes the disturbance estimation means.

Preferably, the disk apparatus further comprises input prohibition means for prohibiting input of the disturbance estimation signal to the correction means till the predetermined time period elapses after the start of input of the pseudo disturbance signal.

With the above structure, the disturbance estimation means does not generate a correct disturbance estimation signal during a predetermined time when the correction signal is adjusted such that the difference signal falls within a predetermined range. During this period, the feed-forward control is not performed in the positioning system, whereby a more stable operation is achieved in the positioning system.

The disk apparatus may further comprises: a disk containing servo information; position detection means for detecting a position of the head by reading the servo information with the head; position error detection means for calculating a head position error from the position of the head and a target position; and position control means for generating the position control signal such that the position error is removed.

Preferably, the disk apparatus further comprises input prohibition means for prohibiting input of the disturbance estimation signal to the correction means during the time when the pseudo disturbance signal is input to the driving means and the voltage signal adjustment means.

During the period when the pseudo disturbance signal is input to the driving means and the voltage adjustment means, the disturbance estimation signal lacks correctness by the component of the pseudo disturbance signal. Therefore, during this period, the pseudo disturbance signal is not input to the correction means, and the feed-forward control is not performed in the positioning system, whereby a more stable operation is achieved in the positioning system.

Preferably, the disturbance estimation means includes: comparison means for receiving the second voltage signal and an induction voltage estimation signal that estimates the second voltage signal to output an error signal which represents an error between the second voltage signal and the induction voltage estimation signal; first multiplication means for multiplying the driving signal by a coefficient formed by a first transfer function; second multiplication means for multiplying the error signal by a coefficient formed by a second transfer function; first integration means for integrating the error signal to generate the disturbance estimation signal; and second integration means for receiving a subtraction value obtained by subtracting an addition value of the disturbance estimation signal and an output signal of the second multiplication means from an output signal of the first multiplication means and integrating the subtraction value to generate the induction voltage estimation signal.

With the above structure, the output of the first multiplication means is a driving torque estimation signal which corresponds to a driving torque that acts against the actuator. The output of the second multiplication means (induction voltage estimation signal) is a feedback factor for the second voltage signal generated by the voltage signal adjustment means. The output of the comparison means, which is a difference between the second voltage signal and the induction voltage estimation signal, is supplied to the first integration means and the second multiplication means. The output of the first integration means that integrates the above difference is a disturbance estimation signal which corresponds to disturbance, such as friction caused by the bearing to the actuator, elastic force caused by the FPC to the actuator, inertial force caused by impact or vibration, or the like. The output of the second multiplication means, which is obtained by multiplying the above difference by a predetermined coefficient, is added to the disturbance estimation signal. Then, a difference between the driving torque estimation signal and a result value of the addition is supplied to the second integration means.

The disturbance estimation signal output by the first integration means is equivalent to a value obtained by correctly estimating disturbance applied to the actuator. Since the feed-forward control is performed such that the disturbance is canceled based on the correctly-calculated disturbance estimation signal, the disturbance applied to the actuator in the following operation is correctly compensated for. Even when a variation of the disturbance is large in the following operation, and in addition, a variation or fluctuation occurs in the resistance value of the voice coil motor of the actuator, positioning of the head at a target track is stably performed, and positioning accuracy is improved even with various variations in the conditions.

A head positioning method of the present invention is a control method for positioning a head in a disk apparatus which has an actuator including a voice coil motor, an arm provided to the voice coil motor, and a head attached to the arm for recording and/or reproducing information.

The positioning method comprises the steps of: generating a position control signal used for positioning the head at a target position; synthesizing the position control signal and a disturbance estimation signal that estimates disturbance to generate a driving signal; generating a pseudo disturbance signal that simulates disturbance applied to the actuator; driving the actuator based on the driving signal and the pseudo disturbance signal; detecting a voltage induced in the voice coil motor by the driving of the actuator to generate a first voltage signal which corresponds to the detected voltage; generating a second voltage signal by adjusting the first voltage signal based on the driving signal, the disturbance estimation signal, and the first voltage signal, except for the times of recording and reproducing information, such that a deviation of a coil resistance of the voice coil motor from a nominal value is corrected; and estimating the magnitude of disturbance applied to the actuator from the driving signal and the second voltage signal to generate the disturbance estimation signal.

Preferably, the step of generating the second voltage signal includes the step of generating the second voltage signal from the driving signal, the pseudo disturbance signal, the disturbance estimation signal, and the first voltage signal.

The step of generating the second voltage signal may include the step of generating the second voltage signal such that the phase of the disturbance estimation signal is generally the same as the phase of the pseudo disturbance signal.

The step of generating the second voltage signal may include the step of generating the second voltage signal such that the largeness of the disturbance estimation signal becomes minimum.

The step of generating the position control signal may include the steps of: reading servo information recorded in a disk in advance with the head to detect the position of the head; calculating a head position error from the position of the head and a target position; and generating the position control signal such that the position error is removed.

As described above, according to the present invention, disturbance, such as bearing friction of the actuator, elastic force of a FPC that connects the actuator and a circuit board, inertial force that acts against the actuator due to impact or vibration externally applied to the disk apparatus, or the like, is correctly estimated. Thus, even when a variation of the disturbance that acts against the actuator is large in the following operation for a target track, the variation of the disturbance is compensated for with high accuracy. Therefore, the accuracy in positioning the head at the target track is improved. In addition, the inertial force that acts against the actuator is canceled, whereby the anti-impact characteristic of the disk apparatus is improved. As a result, positioning of the head is stably performed.

According to the present invention, deviation $\Delta R$ of the coil resistance of the voice coil motor from a nominal value (resistance error) is adjusted, whereby a voltage signal produced by the driving of the actuator is correctly obtained. Then, a disturbance estimation signal is generated based on a resultant second voltage signal and the driving signal, and the disturbance estimation signal and the position control signal are synthesized to generate a driving signal. Thus, even when there is a variation in the resistance value among the voice coil motors of the actuators or even when the resistance value is different from the nominal value due to a resistance value fluctuation caused by an increase in temperature, the positioning system is stabilized.

According to the present invention, even when influence of disturbance that acts against the actuator on the positioning system increases due to decreases in size and weight of the actuator, or the like, (especially, even when there is a variation or fluctuation in the resistance value of the voice coil motor), the accuracy in positioning the head is improved to overcome various variations in the conditions. Thus, the track density can be increased as compared with a conventional density, and therefore, a large-capacity disk apparatus can be realized.

DESCRIPTION OF THE PREFERRED EMBODIMENTS

Figure 1:
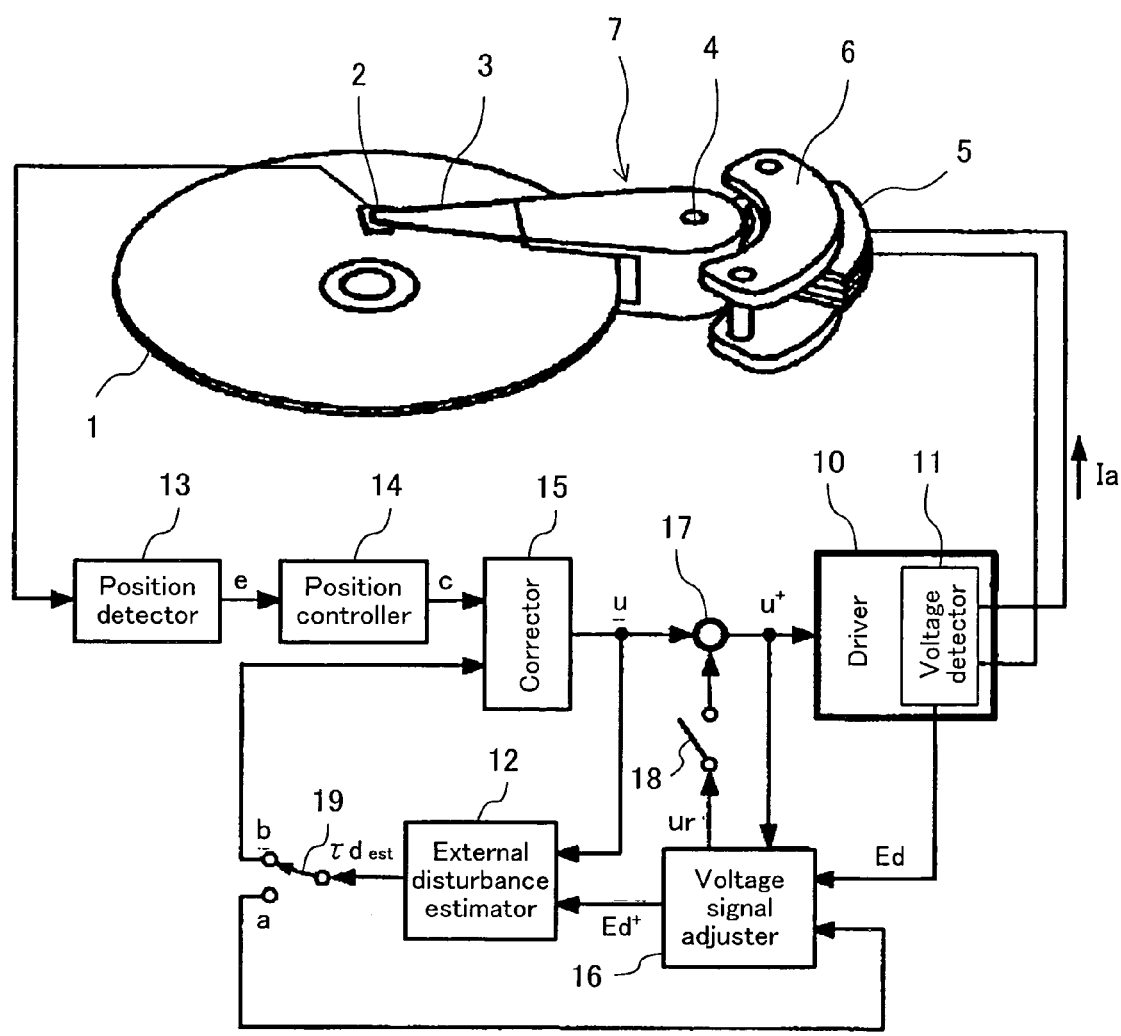
FIG. 1 is a block diagram showing a structure of a disk apparatus.

In the first place, the entirety of an embodiment of a disk apparatus and a disk apparatus control method of the present invention is generally described before descriptions of specific examples.

In order to cancel the effect of disturbance caused by bearing friction and elastic force which act against an actuator, inertial force produced by impact or vibration, or the like, the disk apparatus of the present invention estimates the magnitude of the disturbance and performs control in consideration of the effect of the disturbance. In estimation of the magnitude of the disturbance, a voltage signal related to an induction voltage generated in a voice coil motor and a driving signal used for driving the actuator are employed.

As for the induction voltage of the voice coil motor, it is possible that a voltage signal obtained as a detection result of the induction voltage is used as the first voltage signal. However, in some cases, the resistance value differs among the voice coil motors. In other cases, the voice coil motor emits heat when a driving current flows therethrough, and the resistance value thereof varies due to an increase in temperature. In still other cases, the resistance value changes due to the ambient temperature of the disk apparatus. As the resistance value of the voice coil motor deviates from the nominal value, the first voltage signal changes accordingly.

Thus, in the case where the first voltage signal is used as it is in the disturbance estimation means as a voltage signal indicative of the induction voltage, if there is a variation in the resistance value among the voice coil motors or the resistance value changes, the phase margin disappears from the phase of a gain crossover frequency where the open loop gain becomes zero, and accordingly, the control system becomes unstable. (Details will be described in the later sections.) In view of such, according to the present invention, in voltage signal adjustment means, a pseudo disturbance signal is supplied to driving means, and a second voltage signal is generated by adjusting the first voltage signal based on a driving signal, the pseudo disturbance signal, the disturbance estimation signal and the first voltage signal. Then, instead of the first voltage signal, the second voltage signal is input to the disturbance estimation means and used in estimation of disturbance. With this structure, a voltage signal generated in the driving of the actuator is correctly obtained even when the resistance value differs among the voice coil motors or when the resistance value changes.

The driving signal, which is another element used for estimating disturbance, is a driving signal that is supplied to the driving means of an actuator. Thus, the driving signal is input to the disturbance estimation means in addition to the second voltage signal. Herein, the driving signal may be a signal input to the driving means or may be a signal output from the driving means. Alternatively, a position control signal, which is an origin of the driving signal, may be used in place of the driving signal supplied to the driving means.

That is, the disturbance estimation means is provided for estimating the magnitude of disturbance, and the second voltage signal generated by the voltage signal adjustment means and the driving signal of the driving means are input to the disturbance estimation means to generate a disturbance estimation signal. The disturbance estimation signal generated based on the two elements, the driving signal and the second voltage signal, is a correct estimation of the magnitude of disturbance that actually acts against the head. As a result, disturbance, such as bearing friction in the actuator, elastic force of a FPC which connects the actuator and an electronic circuit board, inertial force that acts against the actuator due to impact or vibration externally applied onto the disk apparatus, or the like, is correctly estimated.

Hereinafter, specific embodiments of the disk apparatus and disk apparatus control method of the present invention are described in detail with reference to the drawings.

(Embodiment 1)

FIG. 1 is a block diagram showing a structure of a magnetic disk apparatus, which is an example of a disk apparatus of embodiment 1 of the present invention.

In FIG. 1, a magnetic disk 1 is rotated by a spindle motor (not shown). A magnetic head 2 records/reproduces data on/from the magnetic disk 1 and is mounted at an end of an arm 3. The arm 3 pivots on a bearing 4 such that the magnetic head 2 moves to a target track on the magnetic disk 1. The other end of the arm 3 is provided with a driving coil 5. A stator 6 is formed by a pair of yokes which face each other with a gap therebetween. At least one of the yokes has an unshown magnet (permanent magnet) fixed thereto at a position corresponding to the gap. This magnet is provided on a surface that faces the driving coil 5 of the yoke. Torque is produced in the arm 3 by the interaction of a magnetic flux generated by the magnet of the stator 6 and a magnetic field generated by an electric current conducted through the driving coil 5. The driving coil 5 and the stator 6 constitute a voice coil motor (VCM). The magnetic head 2, the arm 3, the bearing 4 and the driving coil 5 constitute an actuator 7.

A voltage detector 11 included in a driver 10 detects a voltage generated between the ends of the driving coil 5 to output first voltage signal Ed. A voltage signal adjuster 16 outputs pseudo disturbance signal ur to an adder 17 through a switch 18. The voltage signal adjuster 16 generates second voltage signal Ed+ from driving signal u+(=u+ur) obtained at the adder 17, first voltage signal Ed and disturbance estimation signal $\tau d_{est}$ and outputs the second voltage signal Ed+ to a disturbance estimator 12. The disturbance estimator 12 estimates disturbance torque τd that acts against the arm 3 from second voltage signal Ed+ output by the voltage signal adjuster 16 and driving signal u to output disturbance estimation signal $\tau d_{est}$.

Each sector of the magnetic disk 1 includes a track position signal which is recorded therein in advance as servo information. This position signal is read by the magnetic head 2. A position detector 13 detects a current position of the magnetic head 2 based on the position signal read by the magnetic head 2 to generate position error signal e which indicates a difference between the current position and target position r of the target track. A position controller 14 receives position error signal e generated by the position detector 13 and performs amplification and phase compensation on position error signal e to generate position control signal c. A corrector 15 receives position control signal c from the position controller 14 and disturbance estimation signal $\tau d_{est}$ from the disturbance estimator 12 through a switch 19. The corrector 15 performs correction operations on the received signals to output driving signal u.

The driver 10 allows driving current Ia to flow through the driving coil 5 according to the driving signal input thereto (signal u when the switch 18 is open; signal u+ when the switch 18 is closed) to rotate the arm 3 on the bearing 4, thereby rotationally moving the magnetic head 2 attached at the tip of the arm 3. The driver 10 positions the magnetic head 2 precisely at a target track among the tracks formed at a narrow track pitch in order to record/reproduce data on/from the magnetic disk 1.

Figure 2:
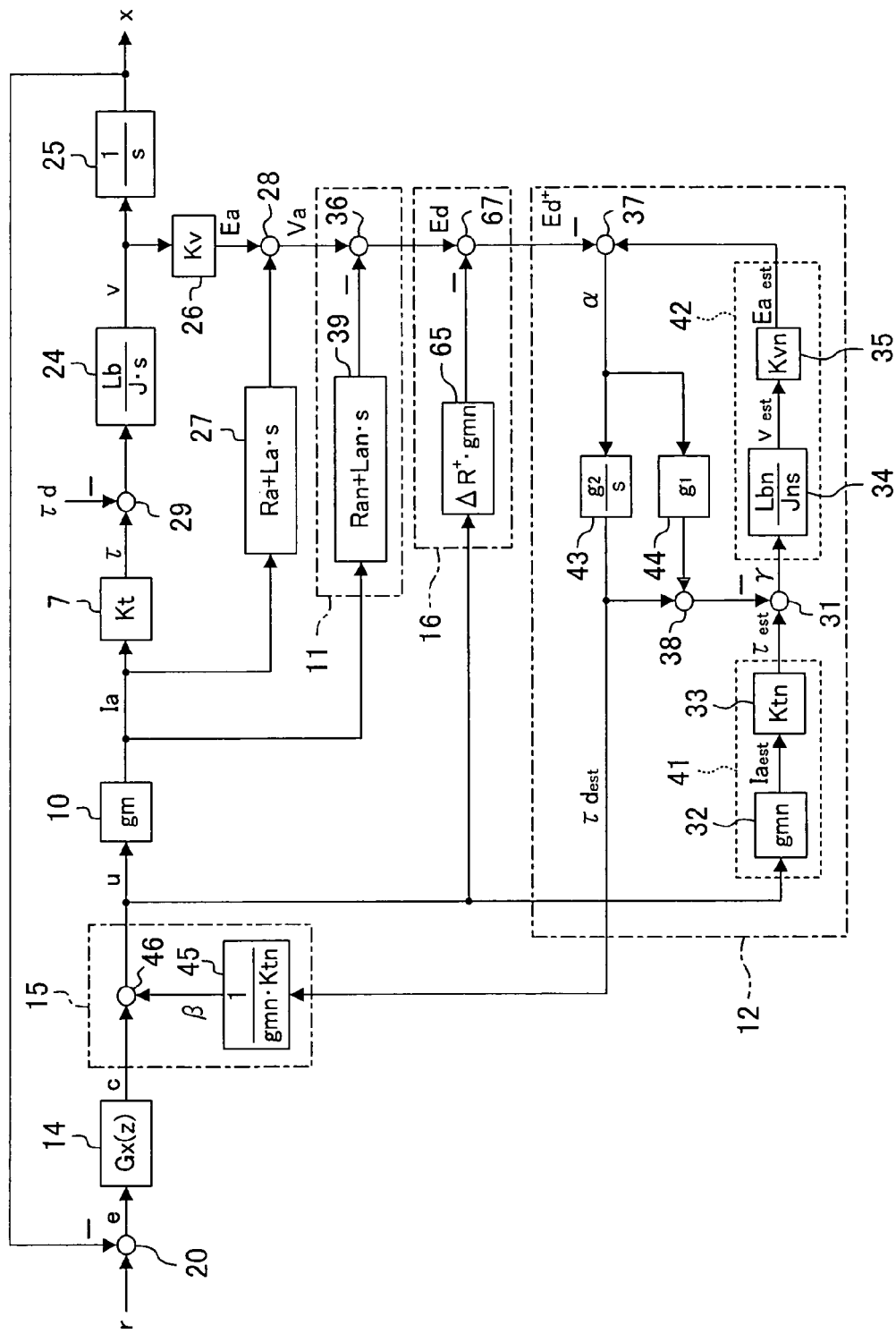
FIG. 2 is a block diagram showing an entire structure of a positioning system of a disk apparatus.

Next, the operation of a positioning system of the disk apparatus of embodiment 1 of the present invention is described with reference to FIG. 2. FIG. 2 is a block diagram showing an entire structure of the positioning system of the above-described magnetic disk apparatus. It is assumed herein that in FIG. 1, the switch 18 is open and the switch 19 is connected to point b.

In FIG. 2, the suffix "s" denotes the Laplace operator. Further, it should be noted that in FIG. 2 the hold element produced by sampling of the sector servo is omitted for simplicity of description.

In FIG. 2 where the current track position detected by the magnetic head 2 is x, the relationship of position error signal e to target track position r is expressed by Expression (1):

$$e = r - x \qquad \text{Expression (1)}$$

This position error signal e is obtained at a comparator 20.

The position controller 14 performs a digital filter process of transfer function Gx(z) on position error signal e output from the comparator 20 to output position control signal c to the corrector 15. In the positioning system, common PID control is performed, and the transfer function of the position controller 14 is expressed by Expression (2):

$$Gx(z) = Kx\left\{1 + a\,d(1 - z^{-1}) + a\,i\frac{z^{-1}}{1 - z^{-1}}\right\} \qquad \text{Expression (2)}$$

where $z^{-1}$ is a sample delay, Kx is the proportional gain of the positioning system, and coefficients ad and ai are constants which represent the frequency characteristics. Coefficient ad is a differential coefficient, and coefficient ai is an integral coefficient. Position control signal c passes through an adder 46 to change into driving signal u. Driving signal u is converted from a voltage signal to a gm-fold current signal by the driver 10 having a transfer function of gm and output as driving current Ia. In the actuator 7, driving current Ia which is conducted through the driving coil 5 is converted to driving torque τ with transfer function Kt by the interaction of the magnetic field produced by the actuator 7 and a magnetic flux of the magnet of the stator 6. Herein, transfer function Kt is a torque constant of the actuator 7. The transfer function of block 24 (Lb/J·s) represents a transfer characteristic from driving torque τ that acts against the arm 3 to traveling velocity v of the magnetic head 2. Herein, J represents the moment of inertia of the arm 3, and Lb represents the distance between the bearing 4 of the arm 3 and the magnetic head 2. Block 25 is an integrator, and the transfer function thereof is represented by 1/s. In the integrator 25, traveling velocity v of the magnetic head 2 is converted to current track position x.

Block 26 outputs induction voltage Ea which is caused between the ends of the driving coil 5 by rotation of the actuator 7. Block 27 outputs the decrement of the voltage, (Ra+La·s)·Ia, which is generated when driving current Ia flows through the driving coil 5. An adder 28 adds together the outputs of blocks 26 and 27 and outputs a result of the addition as terminal voltage Va of the actuator 7. That is, Expression (3) holds:

$$Va = Ea + (Ra + La \cdot s)Ia \qquad \text{Expression (3)}$$

where Ra is the coil resistance of the driving coil 5, and La is the inductance of the driving coil 5.

Various disturbance τd act against the actuator 7. Examples of disturbance τd include the bearing friction of the actuator 7, elastic force of a FPC which connects the actuator 7 and an electronic circuit board, inertial force that acts against the actuator 7 due to impact or vibration externally applied onto the disk apparatus, etc. disturbance τd that acts against the arm 3 can be expressed in a form where disturbance τd is input to a subtractor 29 which is previous to block 24.

The block of the voltage detector 11 includes block 39, which has a transfer function corresponding to the transfer function of block 27, and a subtractor 36. Block 39 outputs a decrement of the voltage, (Ran+Lan·s)·Ia, which is generated when driving current Ia flows through the driving coil 5. The subtractor 36 subtracts the voltage decrement ((Ran+Lan·s)·Ia) from terminal voltage Va of the actuator 7 to output first voltage signal Ed.

In the block of the voltage signal adjuster 16, a multiplier 65 multiplies difference ΔR+ between the transfer function of block 27 and the transfer function of block 39 included in the voltage detector 11 (hereinafter, referred to as "correction signal") by nominal value gmn of the transfer function of the block of the driver 10 to output voltage decrement ΔR+·gmn·u. A subtractor 67 subtracts the voltage decrement (ΔR+·gmn·u) from first voltage signal Ed to output second voltage signal Ed+.

The block of the disturbance estimator 12 includes block 32 which has the same transfer function as that of the block of the driver 10, block 33 which has the same transfer function as that of the block of the actuator 7, block 34 which has the same transfer function as that of block 24, and block 35 which has the same transfer function as that of block 26. The blocks 32 and 33 constitute the first multiplier 41. The block 44 constitutes a second multiplier. The block 43 constitutes a first integrator. The blocks 34 and 35 constitute the second integrator 42. Herein, a constant suffixed with "n" is a nominal value, and a variable suffixed with "est" is an estimated value. Driving signal u input to the block of the driver 10 is also input to block 32 included in the disturbance estimator 12 and then multiplied by (gmn·Ktn) at blocks 32 and 33, whereby driving torque estimation signal $\tau d_{est}$ which is identical to driving torque $\tau$ that acts against the arm 3 is obtained.

Block 34 outputs velocity estimation signal $v_{est}$. Block 35 multiplies velocity estimation signal $v_{est}$ by Kvn to obtain induction voltage estimation signal $Ea_{est}$. Induction voltage estimation signal $Ea_{est}$ is input to a comparator 37 and compared with second voltage signal $Ed^+$. Error signal $\alpha(=Ea_{est}-Ed^+)$ which is obtained as a result of the comparison is input to the first integrator (block 43) and the second multiplier (block 44). The first integrator 43 integrates error signal $\alpha$ to output disturbance estimation signal $\tau d_{est}$. Error signal $\alpha$ which is input to the second multiplier (block 44) is multiplied by g1 and input to an adder 38. The output of the adder 38 is input to a subtractor 31. The subtractor 31 subtracts the output of the adder 38 from driving torque estimation signal $\tau d_{est}$ and outputs a resultant signal, signal $\gamma$, to block 34.

Coefficient g1 of block 44 and coefficient g2 of block 43 are provided for stabilizing the operation of the disturbance estimator 12, and details thereof will be described later.

Block 45 included in the corrector 15 multiplies disturbance estimation signal $\tau d_{est}$ by 1/(gmn·Ktn) to generate correction signal $\beta$ which is necessary for producing the driving force having a magnitude equivalent to disturbance estimation signal $\tau d_{est}$ in the arm 3. Correction signal $\beta$ is added to position control signal c in the adder 46.

Next, the operation of the disturbance estimator 12 is described in detail with reference to FIG. 3.

Figure 3A:
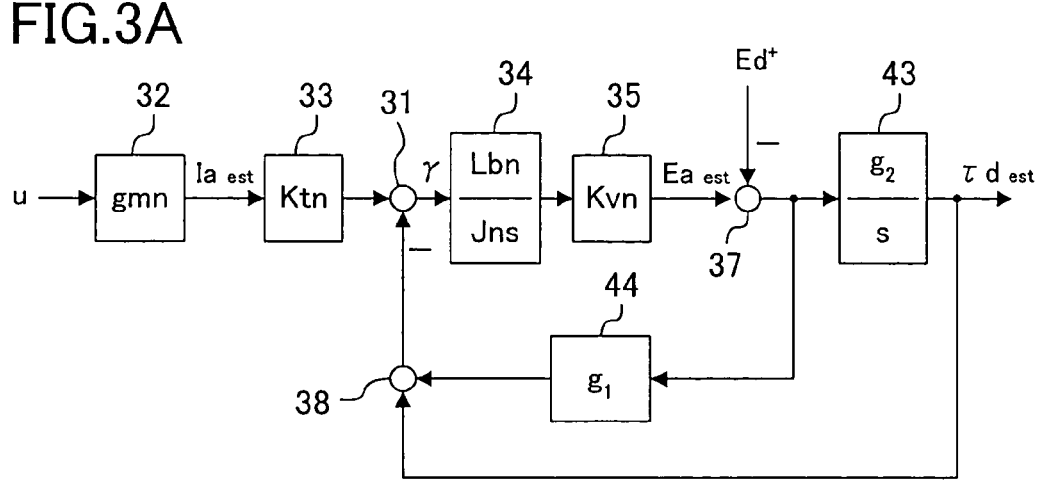
FIG. 3A is a block diagram illustrating a disturbance estimation operation of a disturbance estimator.
Figure 3B:
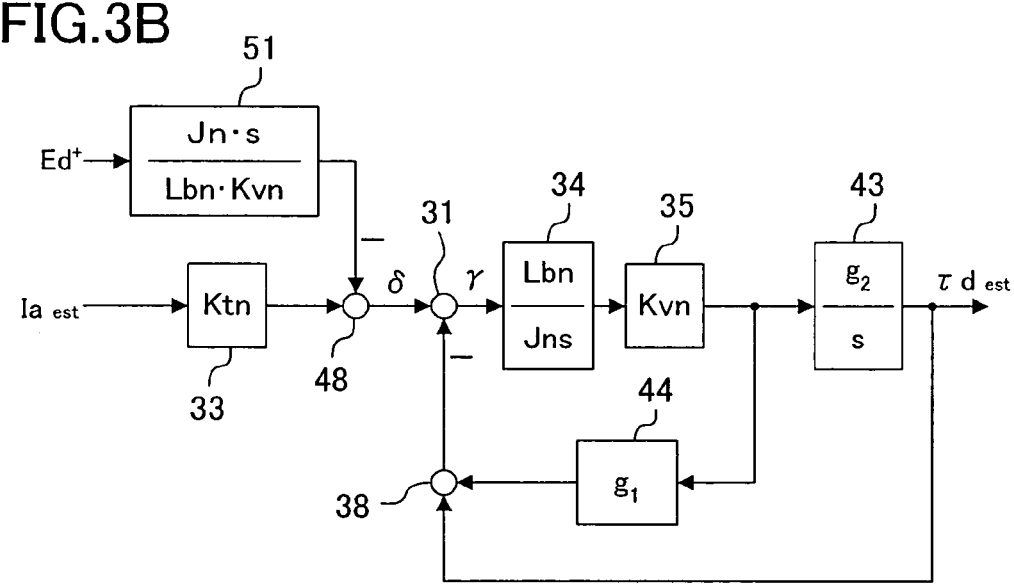
FIG. 3B is a block diagram obtained by equivalently converting the block diagram of FIG. 3A.

FIG. 3A is a block diagram which is a rewritten version of the block of the disturbance estimator 12 of FIG. 2. FIG. 3A shows transfer from the input of driving signal u up to the output of disturbance estimation signal $\tau d_{est}$. FIG. 3B is a modified version of the block diagram of FIG. 3A, which is obtained by equivalently transformationally moving the input position of voltage signal $Ed^+$ (comparator 37) in the block diagram of FIG. 3A. Herein, for convenience of illustration, it is assumed that the value of gm of the block of the driver 10 of FIG. 2 is equal to the value of gmn of block 32, the relationship of Expression (4) holds, and driving current Ia(=gm·u) is equal to estimation current $Ia_{est}$(=gmn·u):

$$gm=gmn \qquad \text{Expression (4)}$$

The largeness of voltage signal $Ed^+$ is multiplied by (Jn·s)/(Lbn·Kvn), whereby the input position of the comparator 37 of FIG. 3A is equivalently moved to the input position of a subtractor 48 of FIG. 3B.

Considering the subtractor 48 of FIG. 3B, the output of the subtractor 48, i.e., $\delta$, is expressed as Expression (5):

$$\delta = Ktn \cdot Ia - \frac{Jn \cdot s}{Lbn \cdot Kvn} Ed^+ \qquad \text{Expression (5)}$$

Where the difference between coil resistance Ra of the driving coil 5 and the nominal value of coil resistance Ran of the driving coil 5 is $\Delta R$, Expression (6) holds:

$$\Delta R = Ra - Ran \qquad \text{Expression (6)}$$

Coil inductance Lan is sufficiently smaller than coil resistance Ran. Thus, in the block diagram of the positioning system of FIG. 2, in block 39 included in the voltage detector 11, only a voltage decrement of coil resistance Ran is considered in the total voltage decrement which occurs due to the flow of driving current Ia through the driving coil 5, whereas the voltage decrement of coil inductance Lan is neglected. That is, assuming that the relationship of Expression (7) holds, the relationships of Expression (8) and Expression (9) are satisfied as ideal conditions:

$$La = Lan = 0 \qquad \text{Expression (7)}$$

$$Ra = Ran \qquad \text{Expression (8)}$$

$$\Delta R = \Delta R^+ = 0 \qquad \text{Expression (9)}$$

Considering the subtractor 36 and the subtractor 67, Expression (3) is assigned, so that first voltage signal Ed and second voltage signal $Ed^+$ are respectively expressed as Expression (10) and Expression (11):

$$Ed = Va - Ran \cdot Ia \qquad \text{Expression (10a)}$$
$$= Ea + \Delta R \cdot Ia$$
$$= Ea \qquad \text{Expression (10)}$$

$$Ed^+ = Ed - \Delta R^+ \cdot gmn \cdot u \qquad \text{Expression (11a)}$$
$$= Ea + \Delta R \cdot Ia - \Delta R^+ \cdot Ia$$
$$= Ea \qquad \text{Expression (11)}$$

Next, considering the subtractor 29 and blocks 24 and 26 of FIG. 2, the relationship of Expression (12) holds:

$$Ea = \frac{Lb \cdot Kv}{J \cdot s}(Kt \cdot Ia - \tau d) \qquad \text{Expression (12)}$$

Herein, the relationships of Expression (13) and Expression (14) are assumed as ideal conditions. Expression (11) and Expression (12) are assigned to Expression (5), whereby Expression (5) is modified to Expression (15):

$$Kt = Ktn \qquad \text{Expression (13)}$$

$$\frac{Lb \cdot Kv}{J} = \frac{Lbn \cdot Kvn}{Jn} \qquad \text{Expression (14)}$$

$$\delta = \tau d \qquad \text{Expression (15)}$$

That is, the output of the subtractor 48, i.e., $\delta$, is equal to disturbance $\tau d$ that acts against the arm 3.

Thus, the transfer function from disturbance $\tau d$ that acts against the arm 3 up to disturbance estimation signal $\tau d_{est}$ is obtained from the block diagram of FIG. 3B as shown in Expression (16):

$$\tau dest = \frac{\frac{Lbn}{Jn} \cdot Kvn \cdot g2}{s^2 + \frac{Lbn}{Jn} \cdot Kvn \cdot g1 \cdot s + \frac{Lbn}{Jn} \cdot Kvn \cdot g2} \cdot \tau d \qquad \text{Expression (16)}$$

It is seen from Expression (16) that the disturbance estimator 12 can estimate actual disturbance τd from driving signal u and second voltage signal Ed⁺ with the secondary delay system by using the loop enclosed by a dash-dot line in FIG. 2.

Where the natural angular frequency (estimated angular frequency) of the secondary delay system is ωo and the damping factor is ζo, constants g1 and g2 that stabilize the operation of the disturbance estimator 12 are respectively expressed as Expression (17) and Expression (18):

$$g1 = 2\zeta o \cdot \omega o \cdot \frac{Jn}{Lbn \cdot Kvn} \qquad \text{Expression (17)}$$

$$g2 = \omega o^2 \cdot \frac{Jn}{Lbn \cdot Kvn} \qquad \text{Expression (18)}$$

Herein, estimated angular frequency ωo is set to be sufficiently higher than the position control band, and damping factor ζo is set so as to be from 0.7 to 1, whereby disturbance τd, such as bearing friction, elastic force, inertial force, or the like, can be correctly estimated by the disturbance estimator 12. It should be noted that the values of ωo and ζo are not limited to the above values.

Expression (16) is modified using Expression (17) and Expression (18) into Expression (19). That is, the block diagram of the disturbance estimator 12 of FIG. 3A can be simplified as shown in block 52 of FIG. 3C:

$$\tau dest = \frac{\omega o^2}{s^2 + 2\zeta o \cdot \omega o \cdot s + \omega o^2} \cdot \tau d \qquad \text{Expression (19)}$$

The block of the corrector 15 of FIG. 2 outputs correction signal β, which is obtained by multiplying disturbance estimation signal τd$_{est}$ by 1/(gmn·Ktn), to the adder 46. That is, by multiplying disturbance estimation signal τd$_{est}$ by 1/(gmn·Ktn), correction signal β which is necessary for producing the driving force having a magnitude corresponding to disturbance estimation signal τd$_{est}$ in the actuator 7 is input to the adder 46. Since correction signal β is multiplied by gmn·Ktn at the block of the driver 10 and the block of the actuator 7, disturbance estimation signal τd$_{est}$ is multiplied by 1/(gmn·Ktn) in advance for the purpose of adjusting the magnitude.

In summary, this control system is arranged such that disturbance τd that acts against the actuator 7, i.e., disturbance τd caused by bearing friction of the actuator 7, elastic force of a FPC which connects the actuator 7 and an electronic circuit board, inertial force that acts against the actuator 7 due to impact or vibration externally applied onto the disk apparatus, or the like, is canceled.

Next, the operation of the corrector 15 is described in detail with reference to FIGS. 4A and 4B.

Figure 4A:
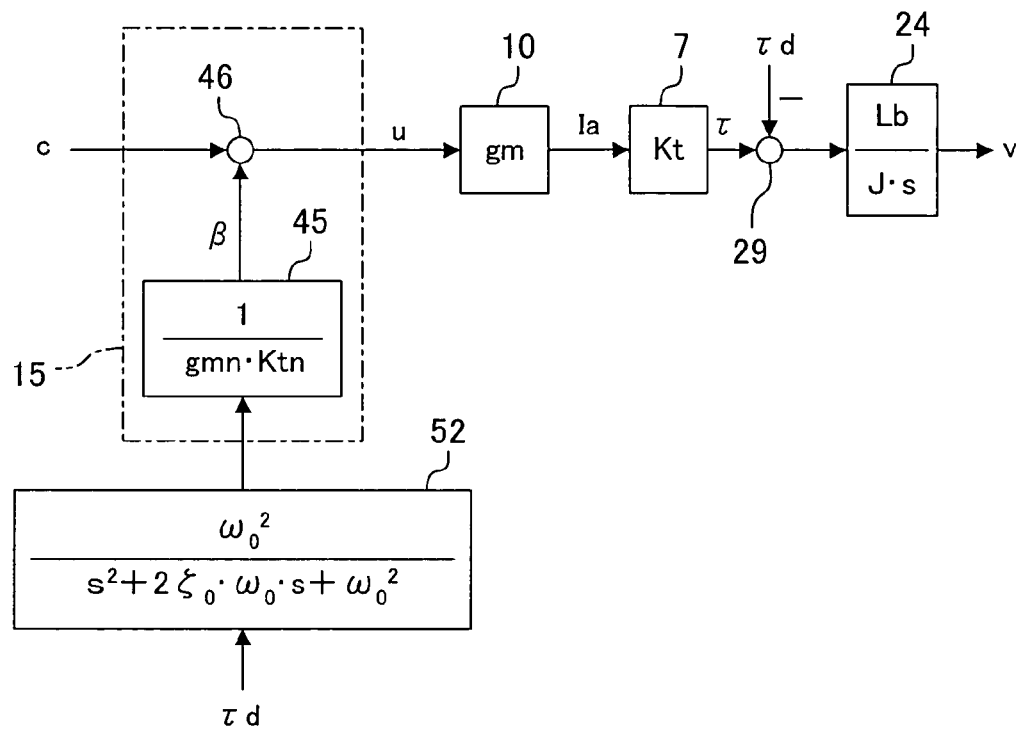
FIG. 4A is a block diagram illustrating the operation of suppressing disturbance that acts against a disk apparatus.

FIG. 4A is a block diagram showing part of the block diagram of FIG. 2 from the adder 46 to the subtractor 29 and block 24 which are related to the operation of the corrector 15. FIG. 4B is a block diagram wherein disturbance τd that acts against the subtractor 29 and disturbance τd that acts against block 52 are combined into a single unit of disturbance τd. It should be noted that like elements are denoted by like reference numerals used in the block diagram of FIG. 2, and therefore, redundant descriptions are herein omitted.

Figure 3C:
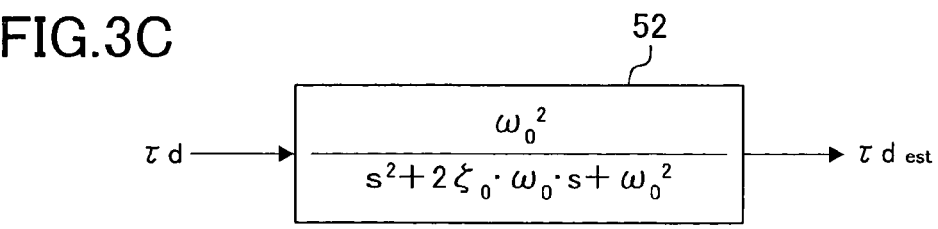
FIG. 3C is a block diagram obtained by reductively modifying the block diagram of FIG. 3A.

In the block diagram of FIG. 4A, block 52 corresponds to block 52 of FIG. 3C and has the transfer function expressed by Expression (16).

Figure 4B:
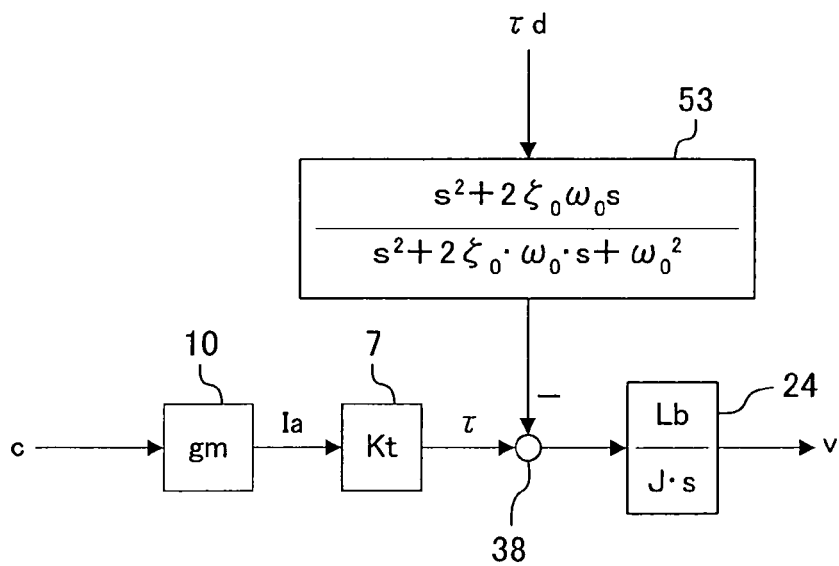
FIG. 4B is a block diagram obtained by equivalently converting the block diagram of FIG. 4A.

Thus, as seen from FIG. 4B, disturbance τd that externally acts against the arm 3 can be regarded such that it acts against the head positioning system through a filter expressed by the transfer function of Expression (20):

$$Gd(s) = 1 - \frac{\omega o^2}{s^2 + 2\zeta o \cdot \omega o \cdot s + \omega o^2} \qquad \text{Expression (20)}$$

$$= \frac{s^2 + 2\zeta o \cdot \omega o \cdot s}{s^2 + 2\zeta o \cdot \omega o \cdot s + \omega o^2}$$

Figure 5:
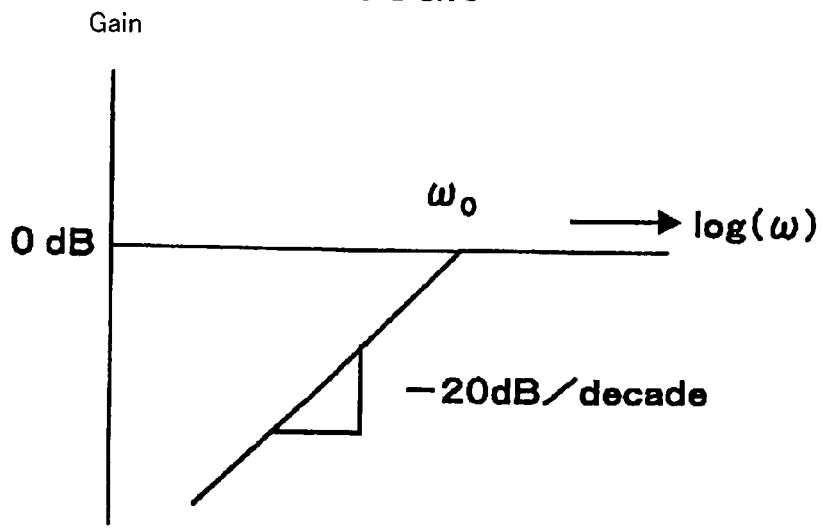
FIG. 5 is a graph showing a cut-off frequency characteristic with respect to disturbance that acts against a disk apparatus.

FIG. 5 illustrates the frequency characteristic of transfer function Gd(s) expressed by Expression (20) in the form of polyline approximation. As seen from the frequency characteristic of transfer function Gd(s) shown in FIG. 5, the gain is 0 dB or lower at an angular frequency lower than ωo and decreases with a decrease ratio of −20 dB/dec (decade) along with the decrease of the angular frequency. It should be noted that "dec" means 10 times. As seen from FIG. 5, transfer function Gd(s) has a low band cut-off filter characteristic which can suppress the frequency components lower than angular frequency ωo.

That is, a disk apparatus of embodiment 1 of the present invention achieves control such that, even when disturbance τd acts against the arm 3, this disturbance τd is estimated by the disturbance estimator 12 and canceled by disturbance estimation signal τd$_{est}$. Thus, externally-applied disturbance τd affects as if it is applied to the head positioning system after passing through a filter having the cut-off frequency characteristic shown in Expression (20) and FIG. 5.

Thus, in the disk apparatus of embodiment 1 of the present invention, the disturbance can be suppressed by a linear low band cut-off characteristic in the case of an angular frequency equal to or lower than ωo.

That is, even when vibration or impact is externally applied so that disturbance τd acts against the actuator 7, the disk apparatus of embodiment 1 of the present invention achieves control such that the externally-applied disturbance τd is canceled. Thus, the disk apparatus achieves an effect as if a physical anti-vibration mechanism is provided to the disk apparatus.

Figure 6A:
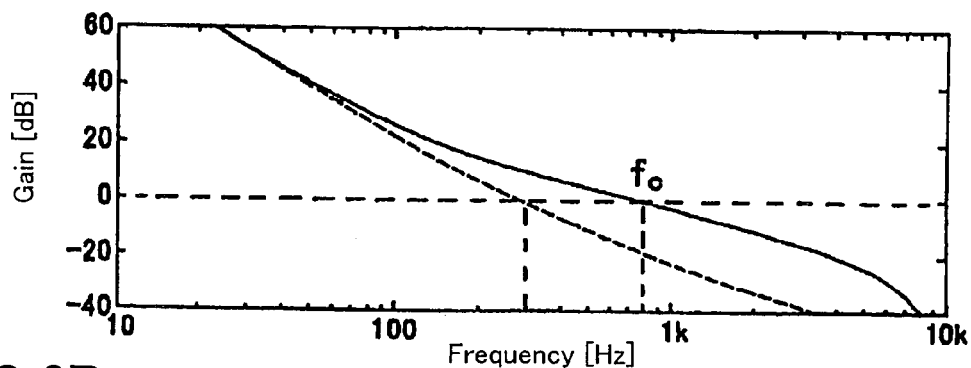
FIG. 6A is a graph showing an open-loop frequency characteristic (gain characteristic) of a positioning system.
Figure 6B:
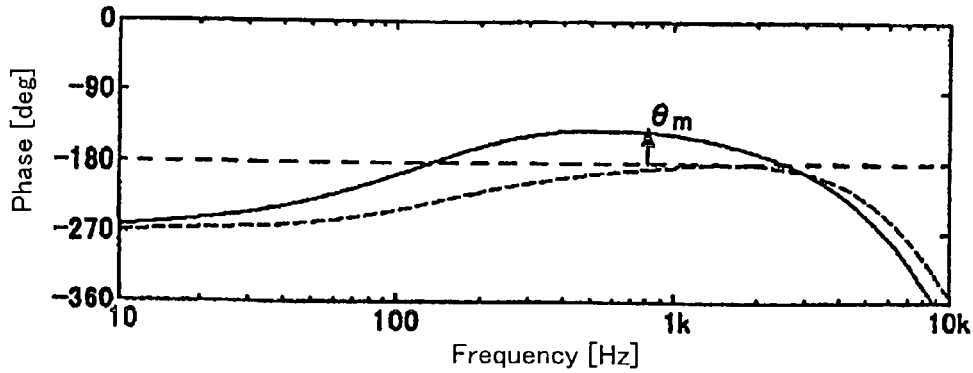
FIG. 6B is a graph showing a phase characteristic of the positioning system.

FIGS. 6A and 6B are graphs of an open loop frequency characteristic, which show transfer from position error signal e to head position x in the block diagram of the positioning system of FIG. 2. The solid line waveform of each of FIGS. 6A and 6B is a graph of an open loop frequency characteristic which illustrates transfer from position error signal e to head position x where coil resistance Ra of the driving coil 5 of the actuator 7 is equal to nominal value Ran. As seen from the gain characteristic graph of FIG. 6A, gain crossover frequency fc is 800 Hz when the open loop gain is zero. As seen from the phase characteristic graph of FIG. 6B, phase margin θm is 50 degree for gain crossover frequency fc, so that the stable head positioning system is structured. This is because, in the block of the voltage detector 11 enclosed by a dash-dot line in FIG. 2, block 39 of (Ran+Lan·s) is assumed as being exactly equal to actual coil resistance Ra based on Expression (7) and Expression (8) in order to calculate the voltage decrement of coil resistance Ran which occurs when driving current Ia flows through the driving coil 5, and as shown in Expression (10), first voltage signal Ed output from the voltage detector 11 is only induction voltage Ea which occurs between the ends of the driving coil 5 when the actuator 7 rotates.

In the above explanation, the positioning system is stable when it is assumed that coil resistance Ran of block 39 included in the voltage detector 11 is equal to coil resistance Ra of the driving coil 5, i.e., the relationship of Expression (8) (Ra=Ran) holds.

However, coil resistance Ra of the driving coil 5 itself includes a variation in the resistance value. Further, the driving coil 5 produces heat when driving current Ia flows through the driving coil 5, and the resistance value changes because of the increase in temperature. Thus, even if coil resistance Ra of the driving coil 5 is first equal to nominal value Ran, the resistance value changes in some cases because of the increase in temperature of the driving coil 5 during operation, so that the relationship of Expression (8) is not satisfied.

Herein, a structure not including the voltage signal adjuster 16 is first described.

The broken line waveform of each of FIGS. 6A and 6B is a graph of an open loop frequency characteristic which illustrates transfer from position error signal e to head position x when coil resistance Ra of the driving coil 5 of the actuator 7 is not equal to nominal value Ran, and the voltage signal adjuster 16 is not provided in the block diagram of the positioning system of FIG. 2. In the simulation, the frequency characteristic is obtained for a case where the component of coil inductance Lan is omitted from block 39 of the voltage detector 11, and coil resistance Ra of the driving coil 5 is greater than nominal value Ran by 5%. As seen from the gain characteristic graph of FIG. 6A, gain crossover frequency fc is 300 Hz when the open loop gain is zero. In such a case, the phase is substantially –210 degree (see FIG. 6B). That is, there is no phase margin, and therefore, the positioning system is unstable.

Next, it is explained that, in the case where coil resistance Ra of the driving coil 5 of the actuator 7 is different from nominal value Ran by 5% (broken lines of FIGS. 6A and 6B), the gain crossover point where the open loop gain is zero greatly decreased as compared with the case of Ra=Ran (solid lines of FIGS. 6A and 6B).

When coil resistance Ra of the driving coil 5 of the actuator 7 is not equal to nominal value Ran, first voltage signal Ed satisfies the relationship of Expression (10).

That is, when coil resistance Ra of the driving coil 5 is different from nominal value Ran because of a variation in the resistance value of the coil itself, a variation in the resistance value due to the increase in temperature, or the like, the voltage detector 11 outputs a result of addition of induction voltage Ea which occurs between the ends of the driving coil 5 when the actuator 7 is rotated and voltage decrement ΔR·Ia which occurs when driving current Ia flows through the driving coil 5.

Figure 7A:
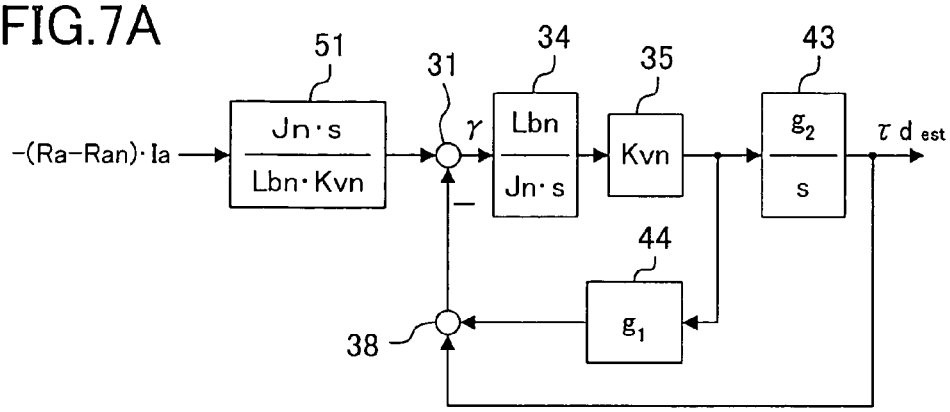
FIG. 7A is a block diagram illustrating a disturbance estimation operation of a disturbance estimator where the resistance value of a driving coil is different from the nominal value.
Figure 7B:
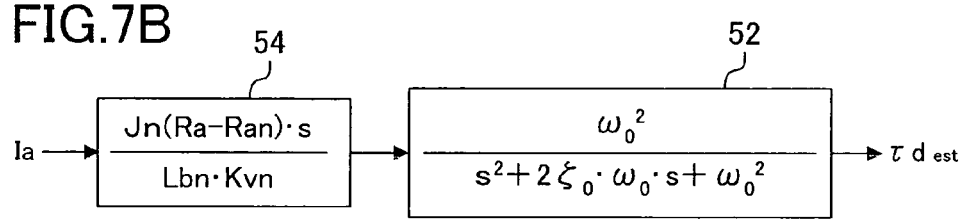
FIG. 7B is a block diagram obtained by equivalently converting the block diagram of FIG. 7A.
Figure 7C:
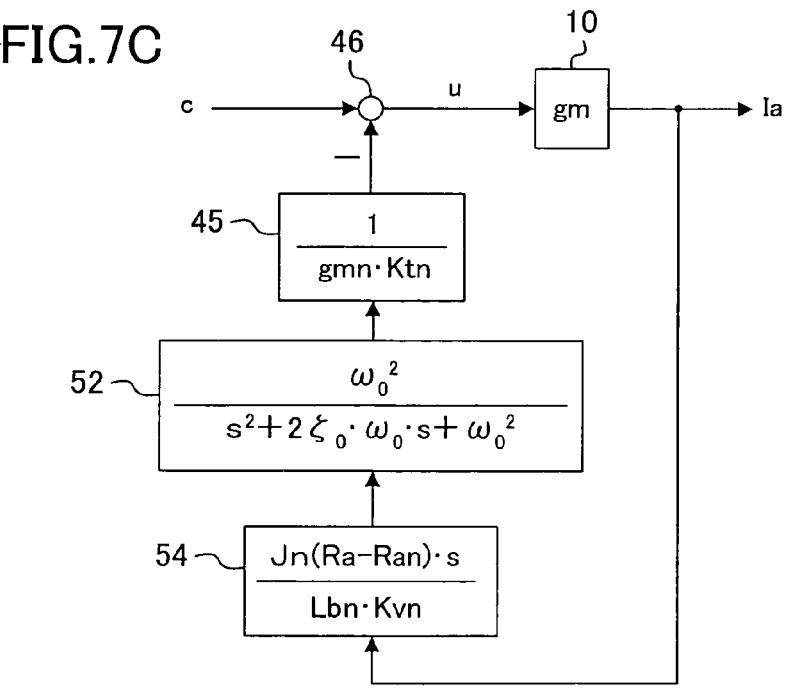
FIG. 7C is a block diagram showing modified parts of the positioning system where the resistance value of a driving coil is different from the nominal value.

FIGS. 7A to 7C are block diagrams illustrating a change in the gain which occurs when the voltage signal adjuster 16 is not provided, and coil resistance Ra of the driving coil 5 is different from nominal value Ran.

FIG. 7A is a modified version of the block diagram of FIG. 3B, which is obtained by rewriting the block diagram of FIG. 3B in respect to the second term of Expression (10a). FIG. 7B is a block diagram which is obtained by equivalently converting the block diagram of FIG. 7A. FIG. 7C is a block diagram which is obtained by rewriting a part of the block diagram of FIG. 2 based on the block diagram of FIG. 7B. That is, when Ra is not equal to Ran, it is equivalent to addition of negative feedback loops of blocks 54, 52 and 45 to the block of the driver 10 (having a transfer function of gm) in the block diagram of FIG. 2.

According to the block diagram of FIG. 7C, synthesized transfer function Gm(s) from position control signal c to driving current Ia is expressed by Expression (21):

$$Gm(s) = \frac{gm}{1 + \frac{gm}{gmn} \cdot \frac{Jn(Ra - Ran)}{Lbn \cdot Kvn \cdot Ktn} \cdot \frac{\omega o^2}{s^2 + 2\zeta o \cdot \omega o \cdot s + \omega o^2} \cdot s} \qquad \text{Expression (21)}$$

Since estimated frequency fo(=ωo/2π) is set to be sufficiently higher than position control band fc, Expression (21) can be simplified as shown in Expression (22):

$$Gm(s) = \frac{gm}{1 + \frac{gm}{gmn} \cdot \frac{Jn(Ra - Ran)}{Lbn \cdot Kvn \cdot Ktn} \cdot s} \qquad \text{Expression (22)}$$

In Expression (22), if Ra=Ran, Gm(s)=gm. However, if Ra≠Ran, the gain of Gm(s) decreases. That is, in the block diagram of the positioning system of FIG. 2, if coil resistance Ra of the driving coil 5 of the actuator 7 is different from nominal value Ran, the positioning system is unstable.

The present invention overcomes such unstableness of the control system (positioning system). The present invention includes the voltage signal adjuster 16. With this component, a correction is made based on resistance error ΔR expressed by Expression (6) even when coil resistance Ra of the driving coil 5 of the actuator 7 differs from nominal value Ran due to a variation in the resistance value of the coil itself, a change in the resistance value which is caused by an increase in temperature, or the like, whereby the voltage signal produced in the driving of the actuator 7 is correctly obtained, and a stable operation is achieved in the positioning system.

Figure 8:
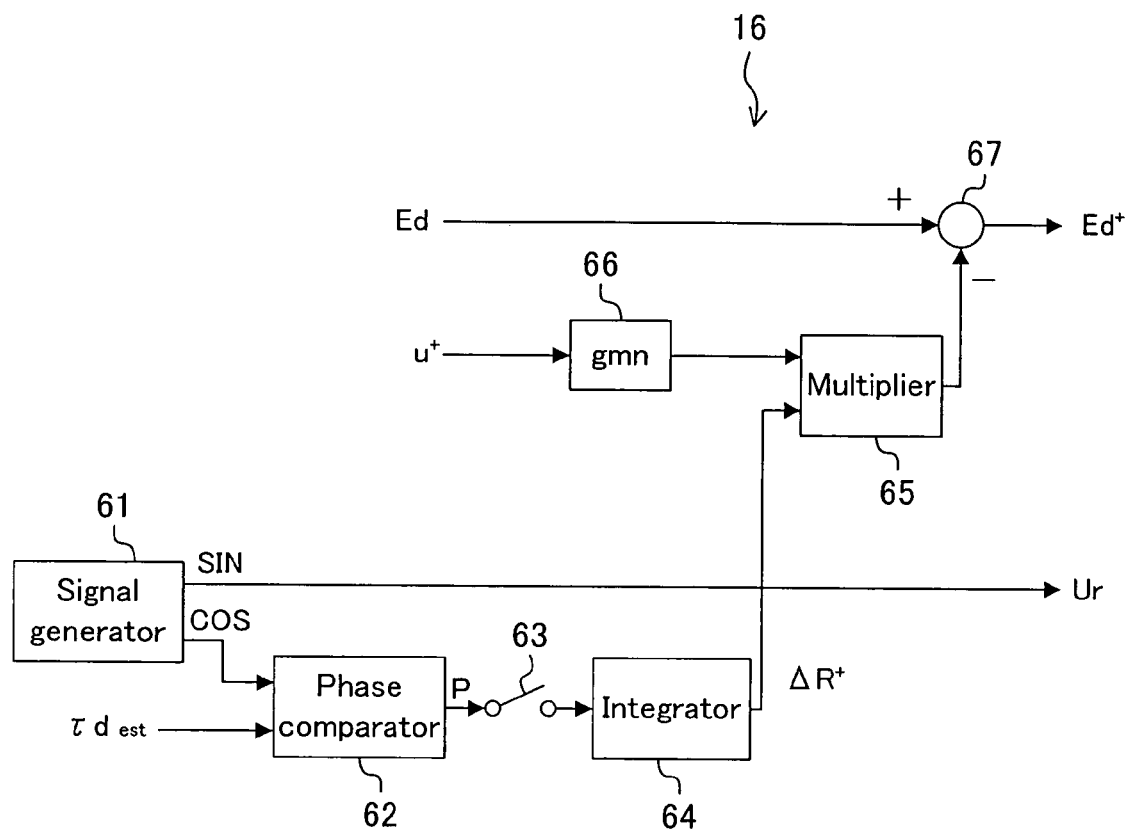
FIG. 8 is a block diagram showing a structure of a voltage signal adjuster according to embodiment 1.

FIG. 8 shows a structure of the voltage signal adjuster 16 in the example of the present invention shown in FIG. 1.

In FIG. 8, reference numeral 61 denotes a signal generator. The signal generator 61 generates first reference signal cos and second reference signal sin which have the same frequency but whose phases are different. Second reference signal sin is output to the adder 17 of FIG. 1 as pseudo disturbance signal ur that is output to the driver 10. A phase comparator 62 receives disturbance estimation signal $\tau d_{est}$ generated by the disturbance estimator 12 and first reference signal cos. The phase comparator 62 multiplies the received signals and integrates a result of the multiplication for a certain time period, thereby sequentially generating phase signal P. Phase signal P is output to an integrator 64 through a switch 63. During the time when the switch 63 is closed, the integrator 64 sequentially integrates phase signal P to generate correction signal $\Delta R^+$. During the time when the switch 63 is open, the integrator 64 holds correction signal $\Delta R^+$. A multiplier 65 receives signal $gmn \cdot u^+(=Ia)$, which has been obtained by multiplying driving signal $u^+(=u+ur)$ obtained at the adder 17 by gm at block 66 and correction signal $\Delta R^+$ from the integrator 64. A generated multiplication result is output to the subtractor 67. The subtractor 67 subtracts a result of multiplication of signal gmn·u⁺, which has been obtained by multiplying driving signal u⁺ by gmn, and correction signal ΔR⁺, i.e., ΔR⁺·gmn·u⁺, from first voltage signal Ed input to the subtractor 67, thereby generating second voltage signal Ed⁺.

Thus, second voltage signal Ed⁺ is expressed by Expression (23):

$$Ed^+ = Ed - \Delta R^+ \cdot gmn \cdot u^+ \qquad \text{Expression (23)}$$
$$= Ed - \Delta R^+ \cdot Ia$$

An operation of the example of the present invention which performs the above signal processing is described in detail with reference to the drawings.

In the first place, an operation of resistance correction is described. Specifically, in the correction operation described herein, a correction is performed in consideration of resistance error ΔR expressed by Expression (6), whereby the voltage signal produced by the driving of the actuator 7 is correctly obtained.

Figure 9A:
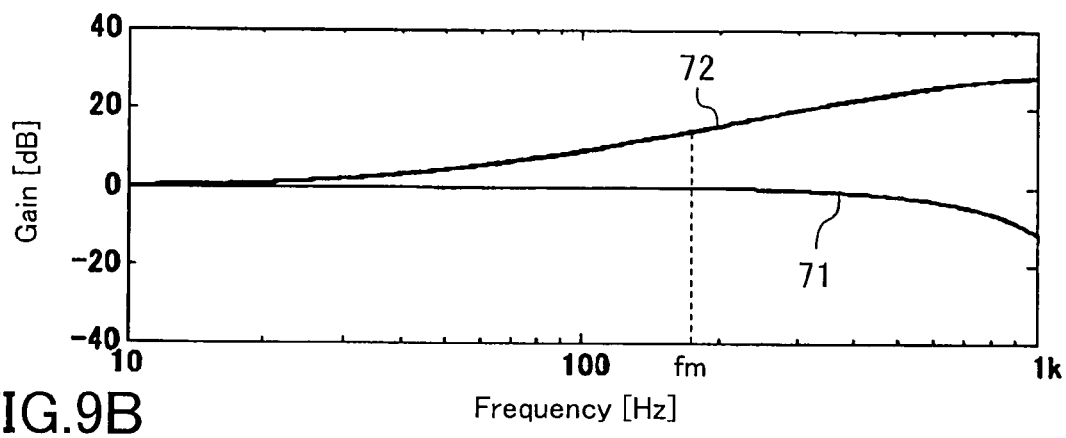
FIG. 9A is a graph of disturbance estimation characteristic (gain characteristic) which illustrates a frequency response of a disturbance estimation signal generated by a disturbance estimator with respect to a pseudo disturbance signal.
Figure 9B:
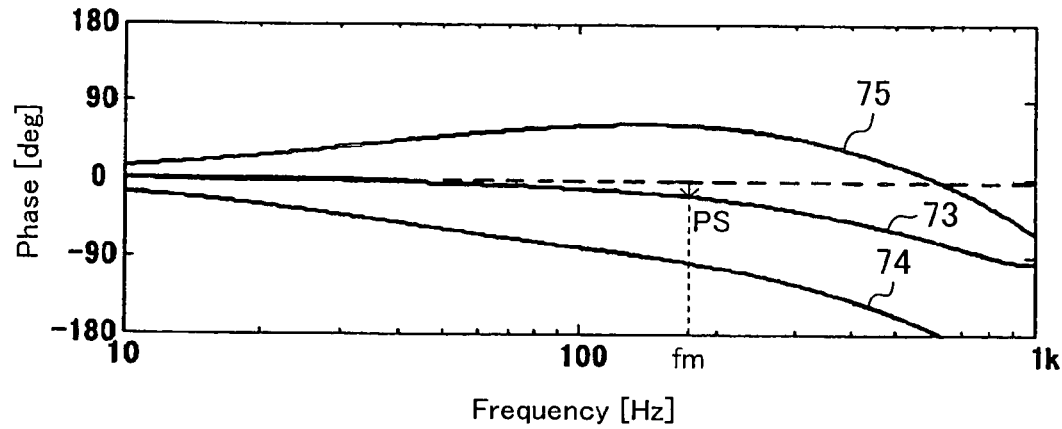
FIG. 9B is a graph showing a phase characteristic of the disturbance estimation signal.

FIGS. 9A and 9B are graphs of the disturbance estimation characteristic, which illustrate the frequency response of disturbance estimation signal $\tau d_{est}$ with respect to an equivalent disturbance of pseudo disturbance signal ur output from the voltage signal adjuster 16.

FIG. 9A illustrates the gain characteristic of the disturbance estimation characteristic. Waveform 71 is obtained when coil resistance Ra of the driving coil 5 is equal to nominal value Ran and resistance error ΔR(=Ra−Ran) is zero. Waveform 72 is obtained when coil resistance Ra of the driving coil 5 is different from nominal value Ran by ±5%.

FIG. 9B illustrates the phase characteristics of the disturbance characteristic. Waveform 73 is obtained when coil resistance Ra of the driving coil 5 is equal to nominal value Ran and resistance error ΔR(=Ra−Ran) is zero. Waveforms 74 and 75 are obtained when coil resistance Ra of the driving coil 5 is different from nominal value Ran by +5% and −5%, respectively. According to the gain characteristic of disturbance estimation signal $\tau d_{est}$ of FIG. 9A, the gain with respect to pseudo disturbance signal ur is higher than 0 dB because of resistance error ΔR.

According to the phase characteristic of disturbance estimation signal $\tau d_{est}$ of FIG. 9B, the phase with respect to pseudo disturbance signal ur greatly changes based on resistance error ΔR. Thus, conversely, resistance error ΔR can be obtained from the phase of disturbance estimation signal $\tau d_{est}$ generated by the disturbance estimator 12. In order to correct resistance error ΔR expressed by Expression (6), pseudo disturbance signal ur having a constant frequency is added to the driver 10, and at this point in time, the phase of disturbance estimation signal $\tau d_{est}$ generated by the disturbance estimator 12 is detected. Then, correction signal ΔR⁺ generated by the integrator 64 of FIG. 8 is adjusted such that the detected phase is the same as that obtained when resistance error ΔR is 0 (ΔR=0) as shown in waveform 73 of FIG. 9B.

Next, the operation of the phase comparator 62 of FIG. 8 is described.

The phase comparator 62 receives first reference signal cos generated by the signal generator 61 and disturbance estimation signal $\tau d_{est}$ generated by the disturbance estimator 12. The phase comparator 62 performs an arithmetic operation expressed by Expression (24):

$$Kp = \int_{(n-1)T}^{nT} \{-\sin(2\pi f \cdot t - \phi) \cdot \cos(2\pi fm \cdot t)\} dt \qquad \text{Expression (24)}$$

where fm denotes the frequency of first reference signal cos input to the phase comparator 62, f and φ denote the frequency and phase of disturbance estimation signal $\tau d_{est}$ input to the phase comparator 62, respectively.

In Expression (24), T denotes the integration time. The phase comparator 62 performs an integration expressed by Expression (24) to generate integration results Kp with intervals of nT (n is an integer).

When frequency f is equal to frequency fm, and integration time T is an integral multiple of a cycle of frequency fin (1/fm), phase sensitivity Kp with respect to phase φ of Expression (24) is expressed in a simple form as shown in Expression (25):

$$Kp = \frac{T}{2}\sin(\phi) \qquad \text{Expression (25)}$$

Figure 10:
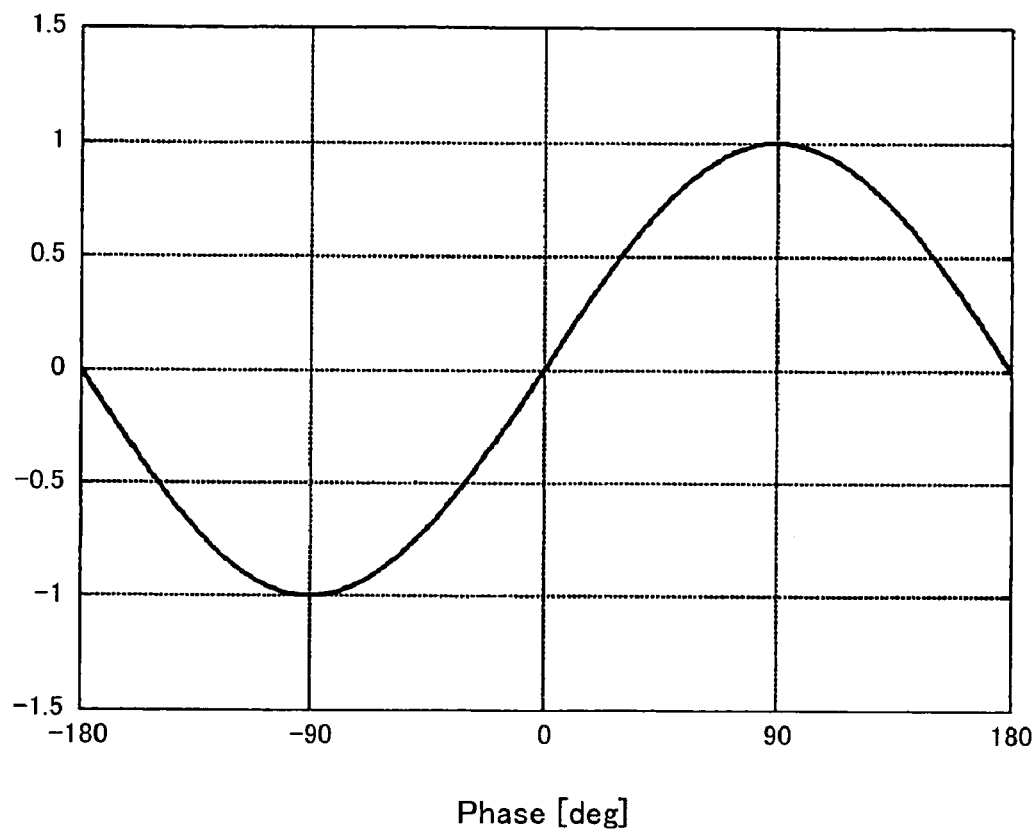
FIG. 10 is a graph showing the phase sensitivity characteristic of a phase comparator.

FIG. 10 is a graph of the phase sensitivity characteristic, wherein phase sensitivity Kp with respect to phase φ of Expression (25) is plotted. The phase sensitivity characteristic is zero when the phase of disturbance estimation signal $\tau d_{est}$ input to the phase comparator 62 is the same as that of first reference signal cos. Phase sensitivity Kp changes with respect to phase φ so as to form a sinusoidal wave. It should be noted that the vertical axis of FIG. 10 is normalized with T/2.

In the voltage signal adjuster 16 of FIG. 8, phase signal P generated by the phase comparator 62 is output to the integrator 64 through the switch 63. Thus, in the case where the phase comparator 62 has the phase sensitivity characteristic of FIG. 10, the integrator 64 integrates phase signal P till phase φ of disturbance estimation signal $\tau d_{est}$ with respect to second reference signal sin becomes zero. When phase signal P input to the integrator 64 becomes zero, correction signal ΔR⁺ generated by the integrator 64 is equal to resistance error ΔR between coil resistance Ra of the driving coil 5 and nominal value Ran (ΔR=Ra−Ran). In this case, in view of Expression (11a), the relationship of Expression (26) holds, so that second voltage signal Ed⁺ is equal to induction voltage Ea produced by the driving of the actuator 7.

$$Ed^+ = Ea \qquad \text{Expression (26)}$$

When frequency f is not equal to frequency fm, and integration time T is an integral multiple of a cycle of frequency fm (1/fm), Expression (24) can be modified to Expression (27):

$$Kp = -\frac{f \cdot \sin(\pi fT)}{\pi(f^2 - fm^2)} \cdot \sin\{2\pi f(n - 0.5)T - \phi\} \qquad \text{Expression (27)}$$
$$\leq \frac{|f \cdot \sin(\pi fT)|}{|\pi(f^2 - fm^2)|}$$

Figure 11:
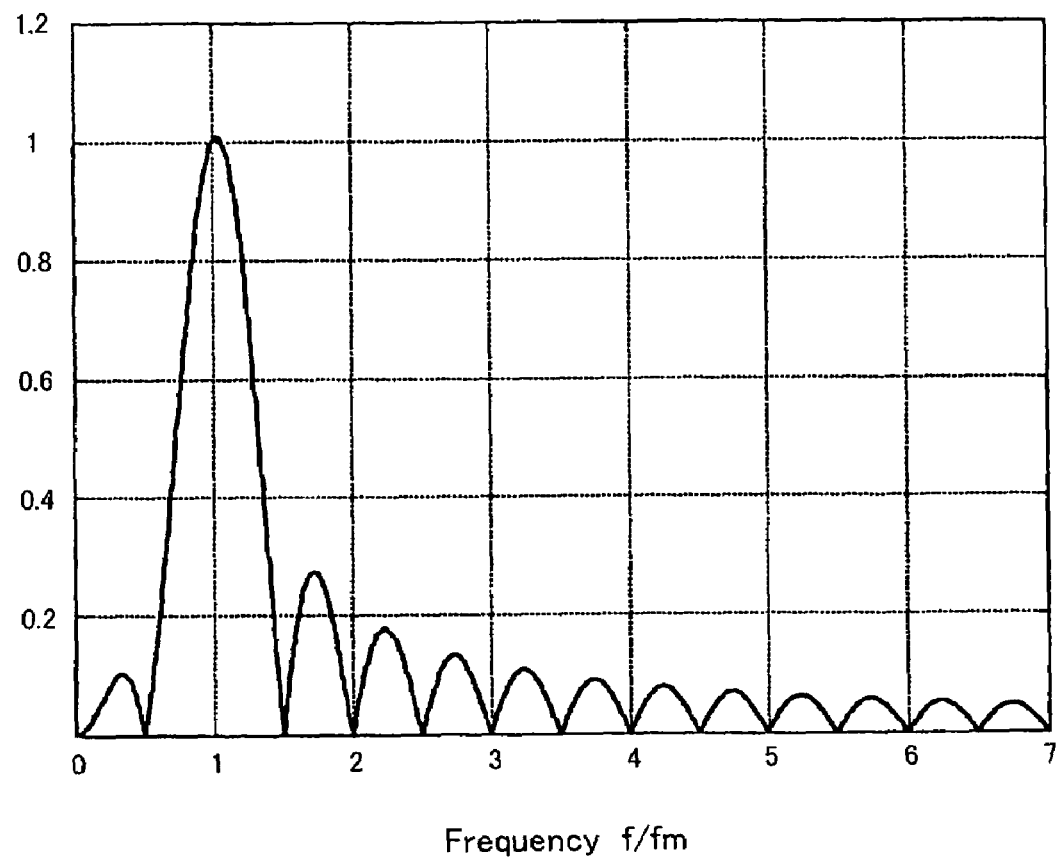
FIG. 11 is a graph showing a maximum sensitivity characteristic of a phase comparator.

FIG. 11 is a graph of the maximum sensitivity characteristic wherein the largeness of absolute value |Kp| of Expression (27) with respect to frequency f is plotted. It should be noted that frequency fm is set such that integration time T is equal to a rotation cycle of a disk, a cycle of frequency fm (1/fm) is a ½ of the rotation cycle of the disk. The vertical axis of FIG. 11 is normalized with T/2. Absolute value |Kp| is large when frequency f is in the vicinity of frequency fm of first reference signal cos but otherwise sharply decreases. Absolute value |Kp| is zero when frequency f is k times frequency fm and when frequency f is (k+0.5) times frequency fm (k is an integer). In a general disk apparatus, the actuator 7 is affected by many disturbances that are in synchronization with the rotation of the disk 1 due to runouts of the disk 1, or the like, as well as the influence of external impact or vibration, the influence of bearing friction in the actuator 7, the influence of elastic force of a FPC that connects the actuator 7 and an electronic circuit board, etc. Thus, disturbance estimation signal $\tau d_{est}$ generated by the disturbance estimator 12 includes many components that are in synchronization with the rotation of the disk 1. In view of such, frequency fm of first reference signal cos input to the phase comparator 62 is set to be equal to an integral multiple of the rotation frequency of the disk, whereby the synchronous components are relatively correctly considered, and an error caused by disturbance which is in synchronization with disk rotation in the phase comparator 62 is reduced. Therefore, even when coil resistance Ra of the driving coil 5 is different from nominal value Ran, frequency fm of first reference signal cos is set to be equal to an integral multiple of the rotation frequency of the disk 1, and resistance error $\Delta R$ expressed by Expression (6) is corrected with correction signal $\Delta R^+$, whereby induction voltage Ea is obtained with high precision. As a result, a stable operation is achieved in the positioning system.

Figure 12A:
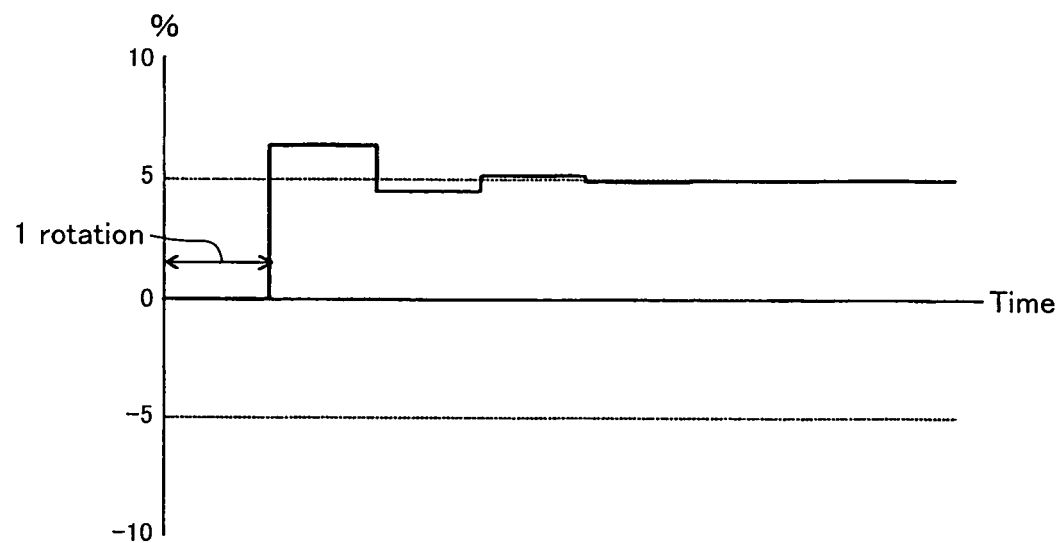
FIG. 12A shows a time response waveform of a resistance error which illustrates a resistance correction operation of the voltage signal adjuster.
Figure 12B:
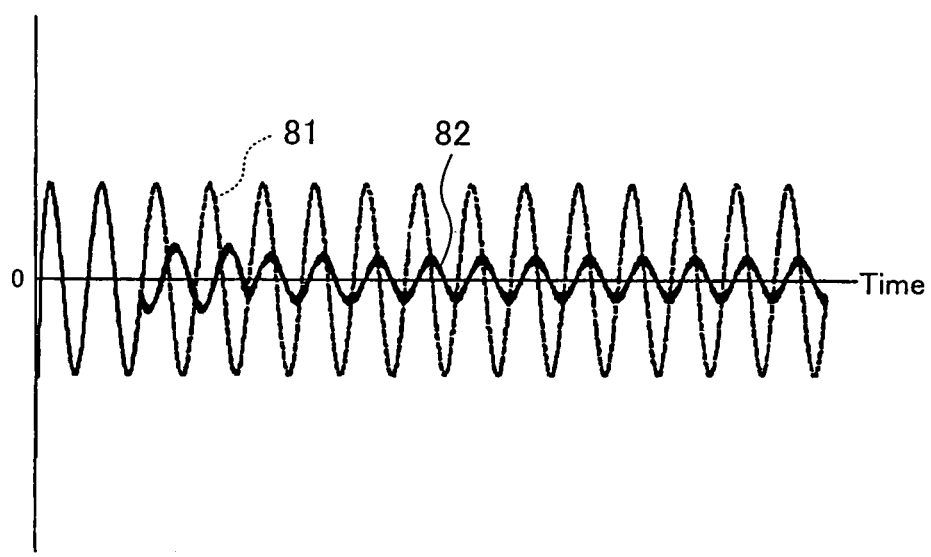
FIG. 12B shows a time response waveform which illustrates the first voltage signal and second voltage signal.

FIGS. 12A and 12B are graphs of time waveforms which illustrate the operation of the voltage signal adjuster 16.

Conditions assumed herein are such that coil resistance Ra of the driving coil 5 is different from nominal value Ran, and resistance error $\Delta R$ is +5% in percentages. Integration time T of the phase comparator 62 is equal to one rotation cycle of the disk.

FIG. 12A shows a time waveform of correction signal $\Delta R^+$ generated by the integrator 64 of FIG. 8. The value of correction signal $\Delta R^+$ is updated every single rotation of the disk and converges on the value of 5% in percentages. As seen from FIG. 12A, 5 disk-rotation cycles later, the value of correction signal $\Delta R^+$ converges on a constant value $\Delta R^+(=\Delta R)$ which is determined according to resistance error $\Delta R$. That is, adjustment of the voltage signal is performed quickly and precisely.

FIG. 12B shows waveform 81 of first voltage signal Ed which is input from the voltage detector 11 to the voltage signal adjuster 16 and waveform 82 of second voltage signal Ed$^+$ which is generated by the multiplier 65 and the subtractor 67 of FIG. 8.

In the case where there is resistance error $\Delta R$ between coil resistance Ra of the driving coil 5 and nominal value Ran, waveform 81 of first voltage signal Ed includes voltage decrement $\Delta R \cdot Ia$, which is caused by resistance error $\Delta R$ and driving current Ia, in addition to induction voltage Ea produced by the driving of the actuator 7 (see Expression (10a)). On the other hand, waveform 82 of second voltage signal Ed$^+$ does not include voltage decrement $\Delta R \cdot Ia$ but only includes induction voltage Ea because voltage decrement $\Delta R \cdot Ia$ caused due to resistance error $\Delta R$ is corrected using correction signal $\Delta R^+$.

In the case where resistance correction is performed in the voltage signal adjuster 16, the switch 18 of FIG. 1 is closed so that pseudo disturbance signal ur is applied to the driver 10 through the adder 17, and the switch 19 is switched to connection point a. Then, the switch 63 of FIG. 8 is closed, and resistance correction is performed. After phase signal P has converged within a predetermined range, and the value of correction signal $\Delta R^+$ has converged on a constant value corresponding to resistance error $\Delta R$, the switch 63 of FIG. 8 is opened to hold the value of correction signal $\Delta R^+$. After resistance correction has been completed, the switch 18 of FIG. 1 is opened, and the switch 19 is switched to connection point b. As described above, disturbance, such as inertial force that acts against the actuator 7, or the like, is correctly detected by the disturbance estimator 12, and the accuracy in positioning a head at a target track is improved. Further, even when there is a variation in the resistance value among the driving coils 5 of the actuators 7, or even when the resistance value of the driving coil 5 changes due to electric conduction, a stable operation is achieved in the positioning system that includes the disturbance estimator 12.

In the above-described example, resistance correction is performed at the voltage signal adjuster 16, and completion of the resistance correction is determined based on whether or not the phase signal is within a predetermined range. However, according to the present invention, completion of the resistance correction may be determined based on time. Specifically, it may be determined after a predetermined time period has elapsed that the resistance correction has been completed. In normal operation, the resistance correction is completed within a short time interval.

In the above descriptions, phase delay ps of disturbance estimation signal $\tau d_{est}$ at resistance error $\Delta R=0$ (see waveform 73 of FIG. 9B) is sufficiently small when pseudo disturbance signal ur of constant frequency fm is input to the driver 10 and is therefore assumed as being zero for simplicity of illustration. However, strictly, phase delay ps is not zero. In the case where such negligence of the phase delay causes an error in the phase signal generated in the phase comparator 62, it is only necessary to delay the phase of first reference signal cos by ps in Expression (24). That is, it is only necessary to replace the term of $\cos(2\pi fm \cdot t)$ in Expression (24) by $\cos(2\pi fm \cdot t - ps)$ before integration. In the signal generator 61 of FIG. 8, the phase of first reference signal cos is delayed by ps when it is generated, and the delayed signal is input to the phase comparator 62. With such a modification, the phase delay of disturbance estimation signal $\tau d_{est}$ is equal to ps when phase signal P is zero. Since the voltage signal adjuster 16 corrects voltage decrement $\Delta R \cdot Ia$ caused due to resistance error $\Delta R$ using correction signal $\Delta R^+$, second voltage signal Ed$^+$ does not include voltage decrement $\Delta R \cdot Ia$ but only include induction voltage Ea produced by the driving of the actuator 7. Thus, a more stable operation is achieved in the positioning system that includes disturbance estimation.

(Embodiment 2)

Figure 13:
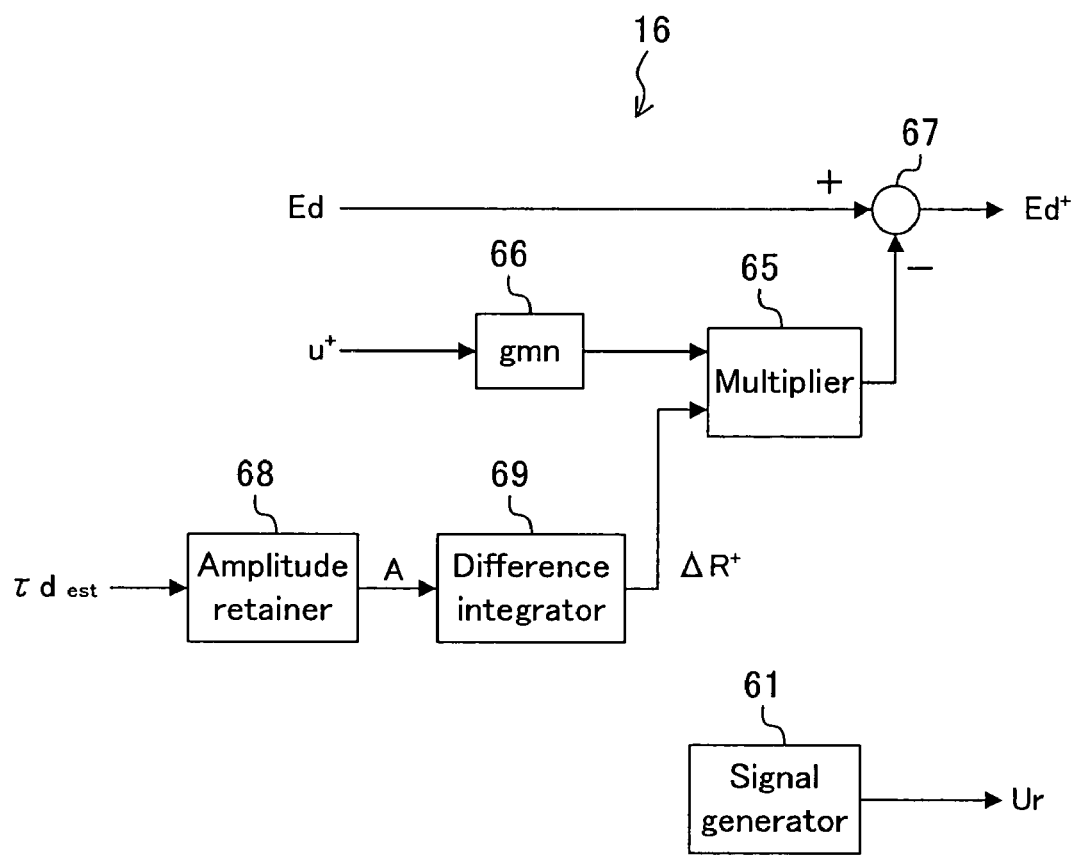
FIG. 13 is a block diagram showing a structure of a voltage signal adjuster according to embodiment 2.

FIG. 13 shows a structure of the voltage signal adjuster 16 in the example of the present invention shown in FIG. 1.

The signal generator 61 generates a reference signal. The reference signal is output as pseudo disturbance signal ur to the adder 17 (FIG. 1). An amplitude retainer 68 receives disturbance estimation signal $\tau d_{est}$ from the disturbance estimator 12. The amplitude retainer 68 retains the maximum value of the amplitude of disturbance estimation signal $\tau d_{est}$ and sequentially generates amplitude signal A with predetermined time intervals. Amplitude signal A is output to a difference integrator 69. The difference integrator 69 generates correction signal $\Delta R^+$ based on amplitude signal A. The multiplier 65 receives signal gmn·u⁺(=Ia), which has been generated at block 66 by multiplying driving signal u⁺(=u+ur) obtained at the adder 17 by gmn, and correction signal ΔR⁺ from the difference integrator 69. A multiplication result obtained at the multiplier 65 is output to the subtractor 67. The subtractor 67 subtracts from first voltage signal Ed input to the subtractor 67 the multiplication result of signal gmn·u⁺ obtained by multiplying driving signal u⁺ by gmn and correction signal ΔR⁺, i.e., multiplication result ΔR⁺·gmn·u⁺, thereby generating second voltage signal Ed⁺.

Thus, second voltage signal Ed⁺ is expressed by Expression (23).

An operation of the example of the present invention in which the above-described signal processing is performed is now described in more detail with reference to the drawings.

In the first place, an operation of resistance correction is described. Specifically, in the correction operation described herein, a correction is performed in consideration of resistance error ΔR expressed by Expression (6), whereby the voltage signal produced by the driving of the actuator 7 is correctly obtained.

According to the gain characteristic of disturbance estimation signal $\tau d_{est}$ of FIG. 9A, it is seen that the gain with respect to pseudo disturbance signal ur is minimum when resistance error ΔR is zero and increases as the absolute value of resistance error ΔR increases. Thus, conversely, resistance error ΔR can be obtained from the amplitude of disturbance estimation signal $\tau d_{est}$ generated by the disturbance estimator 12, which is determined according to pseudo disturbance signal ur. In order to correct resistance error ΔR expressed by Expression (6), pseudo disturbance signal ur with a constant frequency is added to the driver 10, and at this point in time, the amplitude of disturbance estimation signal $\tau d_{est}$ generated by the disturbance estimator 12 is detected. Then, correction signal ΔR⁺ generated by the difference integrator 69 of FIG. 13 is adjusted such that the detected amplitude becomes minimum. That is, resistance error ΔR is zero when the amplitude of disturbance estimation signal $\tau d_{est}$ with respect to pseudo disturbance signal ur with a constant frequency becomes minimum. (This corresponds to the case of resistance error ΔR=0 shown in waveform 71 of FIG. 9A).

Figure 14:
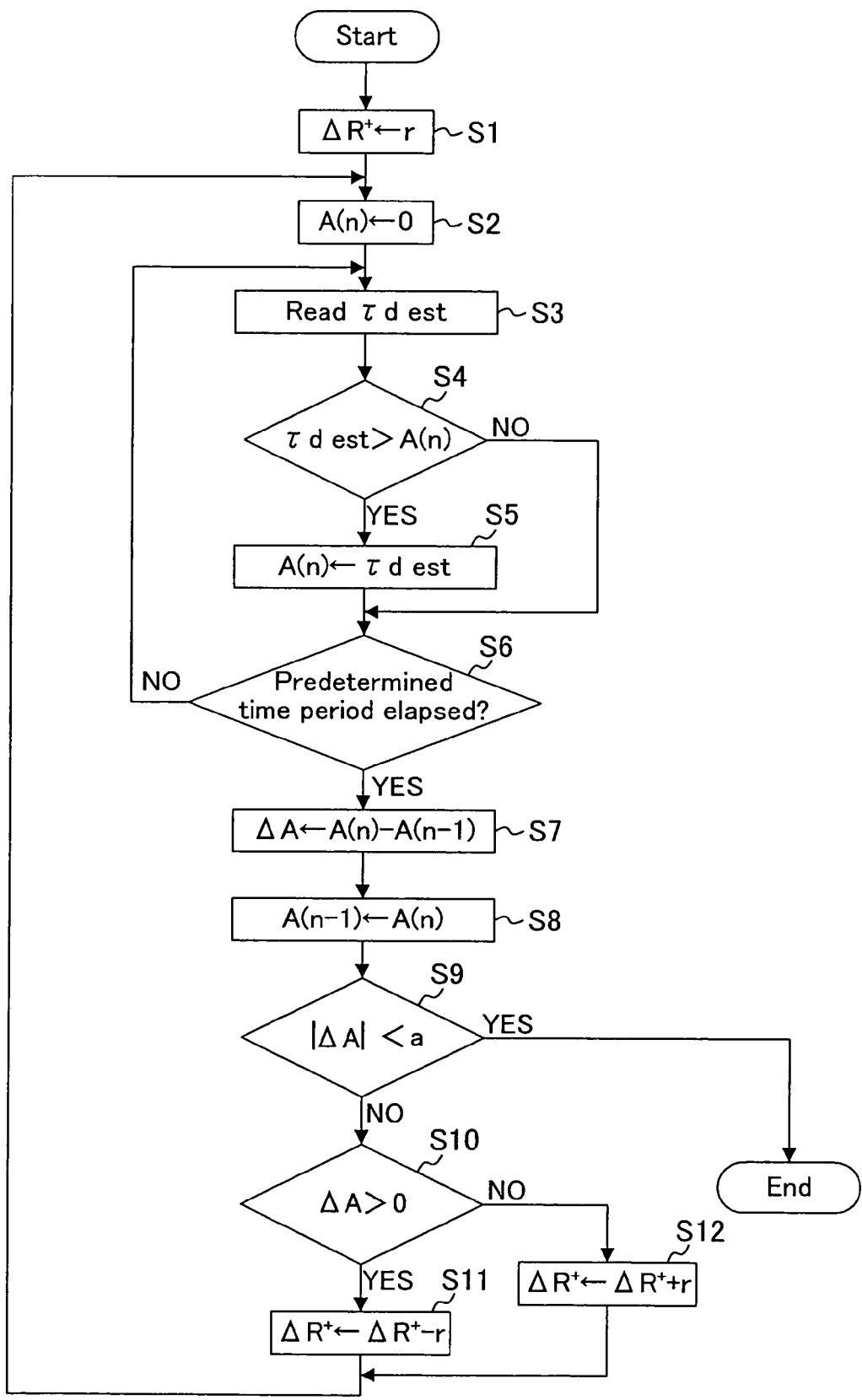
FIG. 14 is a flowchart illustrating an operation of an amplitude retainer and a difference integrator of the voltage signal adjuster of embodiment 2.

Next, an operation of the amplitude retainer 68 and the difference integrator 69 of FIG. 13 is described. FIG. 14 is a flowchart illustrating the operation of the amplitude retainer 68 and the difference integrator 69.

At step S1, step value r is given as an initial value of correction signal ΔR⁺. At step S2, variable A(n) which corresponds to the amplitude of disturbance estimation signal $\tau d_{est}$ is initialized to zero. At step S3, the value of disturbance estimation signal $\tau d_{est}$ is read. At step S4, the value of disturbance estimation signal $\tau d_{est}$ and the value of variable A(n) are compared. If the value of disturbance estimation signal $\tau d_{est}$ is greater than variable A(n), the process proceeds to step S5. Otherwise, the process proceeds to step S6.

At step S5, the value of disturbance estimation signal $\tau d_{est}$ which has been read at step S3 is stored in variable A(n). At step S6, it is determined whether or not a predetermined time period has elapsed after the start of reading the value of disturbance estimation signal $\tau d_{est}$. If the predetermined time period has not yet elapsed, the process returns to step S3. If the predetermined time period has elapsed, the process proceeds to step S7.

At step S7, variable A(n−1) that retains a previous value is subtracted from variable A(n) that corresponds to the amplitude of disturbance estimation signal $\tau d_{est}$, and a result of the subtraction is stored in variable ΔA. That is, ΔA=A(n)−A(n−1), and variable ΔA is a difference signal which is obtained by comparing amplitude signal A(n) generated with predetermined time intervals and previous amplitude signal A(n−1). At step S8, the value of variable A(n) is stored in variable A(n−1).

At step S9, it is determined whether or not the absolute value of variable ΔA is smaller than predetermined value a. If the absolute value of variable ΔA is equal to or greater than predetermined value a, the process proceeds to step S10. At step S10, the sign of variable ΔA is determined. If the sign is positive, the process proceeds to step S11. If the sign is not positive, the process proceeds to step S12.

At step S11, a value obtained by subtracting step value r from the value of correction signal ΔR⁺ is given as an update value of correction signal ΔR⁺, and the process proceeds to step S2. On the other hand, at step S12, a value obtained by adding step value r to the value of correction signal ΔR⁺ is given as an update value of correction signal ΔR⁺, and the process proceeds to step S2.

The operation of steps S2 to S12 is repeated so long as the absolute value of variable ΔA is equal to or greater than predetermined value a at step S9. On the other hand, the above-described flow is ended if the absolute value of variable ΔA is smaller than predetermined value a.

As described above, in the voltage signal adjuster 16 of FIG. 13, correction signal ΔR⁺ generated by the difference integrator 69 is generated stepwise by step value r till the largeness of disturbance estimation signal $\tau d_{est}$ generated by the disturbance estimator 12 becomes minimum with respect to pseudo disturbance signal ur. When the largeness of disturbance estimation signal $\tau d_{est}$ is minimum, correction signal ΔR⁺ generated by the difference integrator 69 is equal to resistance error ΔR between coil resistance Ra of the driving coil 5 and nominal value Ran (ΔR=Ra−Ran). In such a case, in view of Expression (11a), the relationship of Expression (26) holds, so that second voltage signal Ed⁺ is equal to induction voltage Ea produced by the driving of the actuator 7.

Figure 15A:
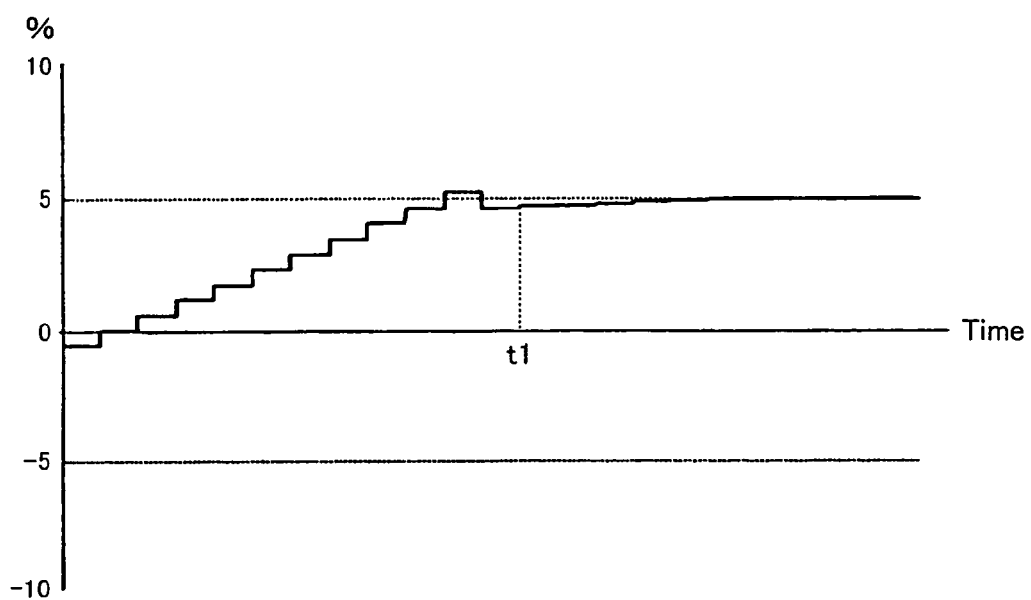
FIG. 15A shows a time response waveform of a resistance error which illustrates a resistance correction operation of the voltage signal adjuster of embodiment 2.
Figure 15B:
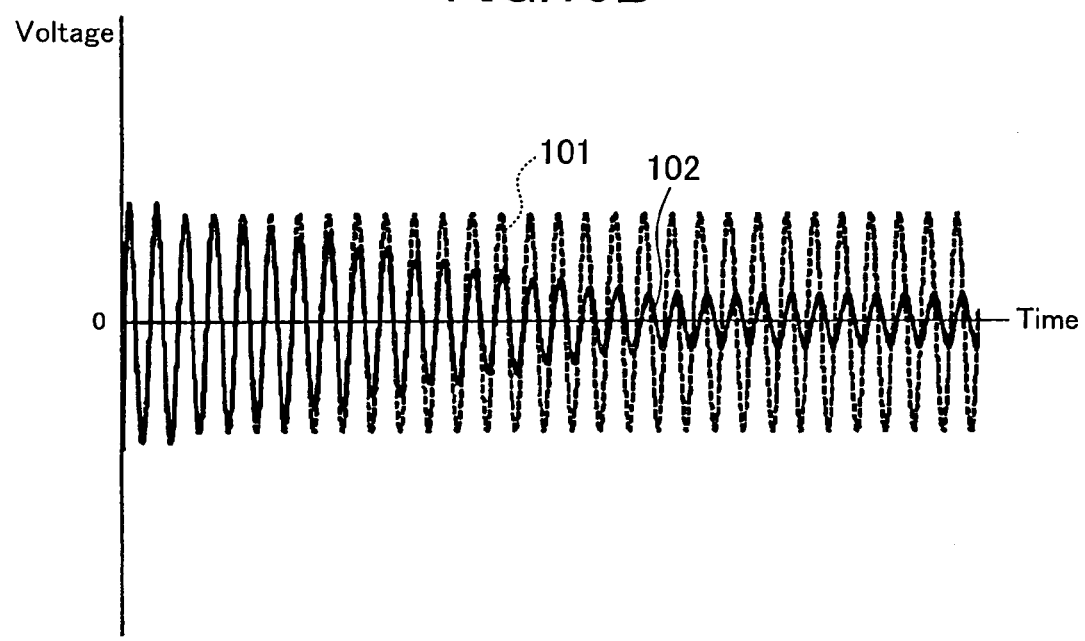
FIG. 15B shows a time response waveform which illustrates the first voltage signal and second voltage signal.

FIGS. 15A and 15B are graphs of time waveforms which illustrate the operation of the voltage signal adjuster 16 where the value of coil resistance Ra of the driving coil 5 differs from the nominal value. Conditions assumed herein are such that coil resistance Ra of the driving coil 5 is different from the nominal value by +5%, i.e., resistance error ΔR is +5%.

FIG. 15A shows a time waveform of correction signal ΔR⁺ generated by the difference integrator 69 of the voltage signal adjuster 16 of FIG. 13. The horizontal axis represents time, and the vertical axis represents a deviation of the coil resistance from the nominal value. As seen from FIG. 15A, the value of correction signal ΔR⁺ is updated with predetermined time intervals and converges on the value of 5% in percentages. Thus, the value of correction signal ΔR⁺ converges on a constant value which is determined according to resistance error ΔR even when there is a deviation in coil resistance Ra of the driving coil 5, and accordingly, adjustment of the voltage signal is performed precisely within a short time period.

In the above description of the flowchart of FIG. 14, step value r used for adjusting correction signal ΔR⁺ is fixed to a constant value at steps S11 and S12. However, according to the present invention, step value r may be changed as necessary. In the time waveform of FIG. 15A which illustrates the operation of the voltage signal adjuster 16, step value r is changed to a ¹⁄₁₀ of its initial value when predetermined time period t1 has elapsed after the start of voltage signal adjustment. As a result, correction signal ΔR⁺ converges more precisely as compared with a case where step value r is fixed. Since the voltage signal adjuster 16 corrects voltage decrement ΔR·Ia caused due to resistance error ΔR using correction signal ΔR⁺, second voltage signal Ed⁺ does not include voltage decrement ΔR·Ia but only include induction voltage Ea produced by the driving of the actuator 7. Thus, a more stable operation is achieved in the positioning system that includes disturbance estimation.

FIG. 15B shows waveform 101 of first voltage signal Ed which is input from the voltage detector 11 to the voltage signal adjuster 16 and waveform 102 of second voltage signal Ed⁺ which is generated by the multiplier 65 and the subtractor 67 of FIG. 13.

In the case where there is resistance error ΔR between coil resistance Ra of the driving coil 5 and nominal value Ran, first voltage signal Ed which is expressed in the form of waveform 101 includes induction voltage Ea produced by the driving of the actuator 7 and voltage decrement ΔR·Ia caused by resistance error ΔR and driving current Ia (see Expression (10a)). On the other hand, in second voltage signal Ed⁺ which is expressed in the form of waveform 102, voltage decrement ΔR·Ia caused due to resistance error ΔR is corrected using correction signal ΔR⁺. Therefore, voltage decrement ΔR·Ia decreases with the passage of time, and second voltage signal Ed⁺ only includes induction voltage Ea produced by the driving of the actuator 7.

In the case where resistance correction is performed in the voltage signal adjuster 16, the switch 18 of FIG. 1 is closed so that pseudo disturbance signal ur is input to the driver 10 through the adder 17, and the switch 19 is switched to connection point a. Then, the above-described resistance correction is performed. After a difference signal of variable ΔA has converged within a predetermined range, and the value of correction signal ΔR⁺ has converged on a constant value corresponding to resistance error ΔR, the value of correction signal ΔR⁺ is retained. As a result, the voltage signal adjuster 16 corrects voltage decrement ΔR·Ia caused due to resistance error ΔR using correction signal ΔR⁺, and therefore, second voltage signal Ed⁺ output from the voltage signal adjuster 16 does not include voltage decrement ΔR·Ia but only include induction voltage Ea produced by the driving of the actuator 7. After resistance correction has been completed, the switch 18 of FIG. 1 is opened, and the switch 19 is switched to connection point b.

As described above, disturbance, such as inertial force that acts against the actuator 7, or the like, is correctly detected by the disturbance estimator 12, and the accuracy in positioning a head at a target track is improved. Further, even when there is a variation in the resistance value among the driving coils 5 of the actuators 7, or even when the resistance value of the driving coil 5 changes due to electric conduction, a stable operation is achieved in the positioning system that includes the disturbance estimator 12.

In the above-described example, resistance correction is performed at the voltage signal adjuster 16, and completion of the resistance correction is determined based on whether or not the difference signal is within a predetermined range. However, according to the present invention, completion of the resistance correction may be determined based on the elapsed time. Specifically, it may be determined after a predetermined time period has elapsed that the resistance correction has been completed. In normal operation, the resistance correction is completed within a short time interval.

(Alternative Embodiments)

In the above-described examples, when the resistance correction is performed at the voltage signal adjuster 16, the switch 19 is switched to connection point a such that disturbance estimation signal $\tau d_{est}$ generated by the disturbance estimator 12 is not input to the corrector 15. However, if voltage decrement ΔR·Ia caused due to resistance error ΔR is relatively small as compared with first voltage signal Ed output by the voltage detector 11, the resistance correction may be performed while disturbance estimation signal $\tau d_{est}$ is input to the corrector 15. In such a case, the switch 19 is not necessary, and accordingly, the structure of the disk apparatus of FIG. 1 is more simplified.

In the disk apparatus of the above-described embodiments of the present invention, one of the inputs to the disturbance estimator 12 is driving signal u output from the corrector 15. However, as a matter of course, the same effects are obtained even if driving current Ia output from the driver 10 is used in place of driving signal u.

In the disk apparatus of the above-described embodiments of the present invention, the multipliers and integrators are formed by analog filters. However, according to the present invention, the multipliers and integrators may be formed by digital filters. Further, each component of the positioning system of the above embodiments of the present invention may be realized by software executed on a microcomputer.

The above embodiments have been described with the examples of a magnetic disk apparatus, but the present invention is not limited thereto. It is a matter of course that the present invention is applicable to other types of information recording apparatuses, such as an optical disk apparatus, a magneto-optical disk apparatus, etc.

What is claimed is:

1. A disk apparatus, comprising:
   an actuator including a voice coil motor, an arm provided to the voice coil motor, and a head attached to the arm for recording and/or reproducing information;
   driving means for driving the actuator, the driving means receiving a driving signal used for driving the actuator and a pseudo disturbance signal that simulates disturbance applied to the actuator;
   a voltage detection means for detecting a voltage induced in the voice coil motor by the driving of the actuator to output a first voltage signal which corresponds to the detected voltage;
   voltage signal adjustment means for outputting the pseudo disturbance signal, receiving the driving signal, a disturbance estimation signal that estimates disturbance, and the first voltage signal, and adjusting the first voltage signal such that a deviation of a coil resistance of the voice coil motor from a nominal value is corrected except for the times of recording and reproduction of the information, thereby generating a second voltage signal; and
   disturbance estimation means for estimating the magnitude of the disturbance applied to the actuator from the driving signal and the second voltage signal to generate the disturbance estimation signal.

2. The disk apparatus of claim 1, wherein:
   the voltage signal adjustment means further receives the pseudo disturbance signal; and
   the disk apparatus further includes correction means for receiving a position control signal used for positioning the head at a target position and the disturbance estimation signal and outputting the driving signal.

3. The disk apparatus of claim 2, wherein the voltage signal adjustment means generates the second voltage signal such that the phase of the disturbance estimation signal is generally the same as the phase of the pseudo disturbance signal.

4. The disk apparatus of claim 3, wherein:
the voltage signal adjustment means includes
signal generation means for generating a first reference signal and a second reference signal,
phase comparison means for receiving the disturbance estimation signal and the first reference signal and integrating a multiplication result obtained by multiplying the disturbance estimation signal and the first reference signal for a predetermined time period, thereby sequentially generating a phase signal,
integration means for sequentially integrating the phase signal to generate a correction signal and holding the correction signal if the value of the phase signal is within a predetermined range,
multiplication means for multiplying the correction signal and a signal obtained by synthesizing the driving signal and the pseudo disturbance signal, and
adjustment means for generating the second voltage signal from a signal output from the multiplication means and the first voltage signal;
the pseudo disturbance signal is formed by the second reference signal; and
input of the pseudo disturbance signal to the driving means and the voltage signal adjustment means lasts till the value of the phase signal falls within a predetermined range.

5. The disk apparatus of claim 4, further comprising input prohibition means for prohibiting input of the disturbance estimation signal to the correction means till the value of the phase signal falls within a predetermined range.

6. The disk apparatus of claim 4, wherein each of the first and second reference signals is formed by a signal having a frequency which is an integral multiple of a rotation frequency of a disk.

7. The disk apparatus of claim 4, wherein:
the first reference signal and the second reference signal have the same frequency but different phases; and
the phase of the first reference signal is further delayed by a phase delay of the disturbance estimation signal with respect to the second reference signal.

8. The disk apparatus of claim 4, wherein the phase signal is generated by time-integrating a multiplication result obtained by multiplying the disturbance estimation signal and the first reference signal for a time period which is an integral multiple of a rotation cycle of a disk.

9. The disk apparatus of claim 3, wherein:
the voltage signal adjustment means includes
signal generation means for generating a first reference signal and a second reference signal,
phase comparison means for receiving the disturbance estimation signal and the first reference signal and integrating a multiplication result obtained by multiplying the disturbance estimation signal and the first reference signal for a predetermined time period, thereby sequentially generating a phase signal,
integration means for integrating the phase signal to generate a correction signal and holding the correction signal after the passage of a predetermined time period,
multiplication means for multiplying the correction signal and a signal obtained by synthesizing the driving signal and the pseudo disturbance signal, and
adjustment means for generating the second voltage signal from a signal output from the multiplication means and the first voltage signal;
the pseudo disturbance signal is formed by the second reference signal; and
input of the pseudo disturbance signal to the driving means and the voltage signal adjustment means lasts for a predetermined time period.

10. The disk apparatus of claim 9, further comprising input prohibition means for prohibiting input of the disturbance estimation signal to the correction means till a predetermined time period elapses after the start of input of the pseudo disturbance signal.

11. The disk apparatus of claim 9, wherein each of the first and second reference signals is formed by a signal having a frequency which is an integral multiple of a rotation frequency of a disk.

12. The disk apparatus of claim 9, wherein:
the first reference signal and the second reference signal have the same frequency but different phases; and
the phase of the first reference signal is further delayed by a phase delay of the disturbance estimation signal with respect to the second reference signal.

13. The disk apparatus of claim 9, wherein the phase signal is generated by time-integrating a multiplication result obtained by multiplying the disturbance estimation signal and the first reference signal for a time period which is an integral multiple of a rotation cycle of a disk.

14. The disk apparatus of claim 2, wherein the voltage signal adjustment means generates the second voltage signal such that the largeness of the disturbance estimation signal becomes minimum.

15. The disk apparatus of claim 14, wherein:
the voltage signal adjustment means includes
signal generation means for generating a reference signal,
amplitude retaining means for receiving the disturbance estimation signal, detecting a maximum value of the amplitude of the disturbance estimation signal every predetermined cycle while retaining the maximum value, and generating an amplitude signal which represents the maximum value at the end of each cycle,
difference integration means for outputting a correction signal used for generating the second voltage signal and generating a difference signal that represents a difference between an amplitude signal of a current cycle and an amplitude signal of an immediately previous cycle every cycle, wherein if the difference signal is not within a predetermined range, the difference integration means adjusts the correction signal such that the difference signal falls within the predetermined range, and if the difference signal is within the predetermined range, the difference integration means holds the correction signal,
multiplication means for multiplying the correction signal and a signal obtained by synthesizing the driving signal and the pseudo disturbance signal, and
adjustment means for generating the second voltage signal from a signal output from the multiplication means and the first voltage signal;
the pseudo disturbance signal is formed by the reference signal; and
input of the pseudo disturbance signal to the driving means and the voltage signal adjustment means lasts till the difference signal falls within the predetermined range.

16. The disk apparatus of claim 15, further comprising input prohibition means for prohibiting input of the disturbance estimation signal to the correction means till the difference signal falls within the predetermined range.

17. The disk apparatus of claim 14, wherein:
the voltage signal adjustment means includes
signal generation means for generating a reference signal,
amplitude retaining means for receiving the disturbance estimation signal, detecting a maximum value of the amplitude of the disturbance estimation signal every predetermined cycle while retaining the maximum value, and generating an amplitude signal which represents the maximum value at the end of each cycle,
difference integration means for outputting a correction signal used for generating the second voltage signal and generating a difference signal that represents a difference between an amplitude signal of a current cycle and an amplitude signal of an immediately previous cycle every cycle, wherein if the difference signal is not within a predetermined range, the difference integration means adjusts the correction signal such that the difference signal falls within the predetermined range, and after the passage of a predetermined time period, the difference integration means holds the correction signal,
multiplication means for multiplying the correction signal and a signal obtained by synthesizing the driving signal and the pseudo disturbance signal, and
adjustment means for generating the second voltage signal from a signal output from the multiplication means and the first voltage signal;
the pseudo disturbance signal is formed by the reference signal; and
input of the pseudo disturbance signal to the driving means and the voltage signal adjustment means lasts till the predetermined time period elapses.

18. The disk apparatus of claim 17, further comprising input prohibition means for prohibiting input of the disturbance estimation signal to the correction means till the predetermined time period elapses after the start of input of the pseudo disturbance signal.

19. The disk apparatus of claim 2, further comprising:
a disk containing servo information;
position detection means for detecting a position of the head by reading the servo information with the head;
position error detection means for calculating a head position error from the position of the head and a target position; and
position control means for generating the position control signal such that the position error is removed.

20. The disk apparatus of claim 2, further comprising input prohibition means for prohibiting input of the disturbance estimation signal to the correction means during the time when the pseudo disturbance signal is input to the driving means and the voltage signal adjustment means.

21. The disk apparatus of claim 1, wherein the disturbance estimation means includes:
comparison means for receiving the second voltage signal and an induction voltage estimation signal that estimates the second voltage signal to output an error signal which represents an error between the second voltage signal and the induction voltage estimation signal;
first multiplication means for multiplying the driving signal by a coefficient formed by a first transfer function;
second multiplication means for multiplying the error signal by a coefficient formed by a second transfer function;
first integration means for integrating the error signal to generate the disturbance estimation signal; and
second integration means for receiving a subtraction value obtained by subtracting an addition value of the disturbance estimation signal and an output signal of the second multiplication means from an output signal of the first multiplication means and integrating the subtraction value to generate the induction voltage estimation signal.

22. A head positioning method in a disk apparatus which has an actuator including a voice coil motor, an arm provided to the voice coil motor, and a head attached to the arm for recording and/or reproducing information, the positioning method comprising the steps of:
generating a position control signal used for positioning the head at a target position;
synthesizing the position control signal and a disturbance estimation signal that estimates disturbance to generate a driving signal;
generating a pseudo disturbance signal that simulates disturbance applied to the actuator;
driving the actuator based on the driving signal and the pseudo disturbance signal;
detecting a voltage induced in the voice coil motor by the driving of the actuator to generate a first voltage signal which corresponds to the detected voltage;
generating a second voltage signal by adjusting the first voltage signal based on the driving signal, the disturbance estimation signal, and the first voltage signal, except for the times of recording and reproducing information, such that a deviation of a coil resistance of the voice coil motor from a nominal value is corrected; and
estimating the magnitude of disturbance applied to the actuator from the driving signal and the second voltage signal to generate the disturbance estimation signal.

23. The head positioning method of claim 22, wherein the step of generating the second voltage signal includes the step of generating the second voltage signal from the driving signal, the pseudo disturbance signal, the disturbance estimation signal, and the first voltage signal.

24. The head positioning method of claim 23, wherein the step of generating the second voltage signal includes the step of generating the second voltage signal such that the phase of the disturbance estimation signal is generally the same as the phase of the pseudo disturbance signal.

25. The head positioning method of claim 23, wherein the step of generating the second voltage signal includes the step of generating the second voltage signal such that the largeness of the disturbance estimation signal becomes minimum.

26. The head positioning method of claim 22, wherein the step of generating the position control signal includes the steps of:
reading servo information recorded in a disk in advance with the head to detect the position of the head;
calculating a head position error from the position of the head and a target position; and
generating the position control signal such that the position error is removed.

* * * * *